(12) United States Patent
Sakagami et al.

(10) Patent No.: US 9,057,438 B2
(45) Date of Patent: Jun. 16, 2015

(54) COMPRESSION CONTROL DEVICE FOR CONTINUOUSLY VARIABLE TRANSMISSION

(75) Inventors: Kyohei Sakagami, Wako (JP); Hirohiko Totsuka, Wako (JP); Masato Shigenaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/234,477

(22) PCT Filed: Jun. 20, 2012

(86) PCT No.: PCT/JP2012/065743
§ 371 (c)(1),
(2), (4) Date: Jan. 23, 2014

(87) PCT Pub. No.: WO2013/021732
PCT Pub. Date: Feb. 14, 2013

(65) Prior Publication Data
US 2014/0172254 A1 Jun. 19, 2014

(30) Foreign Application Priority Data
Aug. 9, 2011 (JP) .................................. 2011-173647

(51) Int. Cl.
*G06F 7/00* (2006.01)
*F16H 61/662* (2006.01)
(Continued)

(52) U.S. Cl.
CPC ............... *F16H 61/662* (2013.01); *F16H 59/14* (2013.01); *F16H 61/66272* (2013.01); *F16H 2061/66277* (2013.01); *F16H 2059/465* (2013.01); *F16H 61/02* (2013.01)

(58) Field of Classification Search
CPC ............... F16H 59/14; F16H 61/66272; F16H 2059/465; F16H 61/662; F16H 61/02; F16H 2061/66277
See application file for complete search history.

(56) References Cited

U.S. PATENT DOCUMENTS 5,964,818 A 10/1999 Kanehara et al.
6,389,348 B1 * 5/2002 Takagi et al. .................. 701/58
(Continued)

FOREIGN PATENT DOCUMENTS

JP 10-89429 A 4/1998
JP 2005265069 A 9/2005
(Continued)

OTHER PUBLICATIONS

International Search Report for PCT/JP2012/065743, Mailing Date of Aug. 21, 2012.
(Continued)

*Primary Examiner* — David D Le
(74) *Attorney, Agent, or Firm* — Westerman, Hattori, Daniels & Adrian, LLP

(57) ABSTRACT

A compression control device for a continuously variable transmission is provided in which when estimating the torque ratio, which is the ratio of the actually transmitted torque relative to the maximum transmittable torque of the continuously variable transmission, based on the transmission characteristics for transmitting the given variable component of the input shaft to the output shaft via an endless belt, a slip identifier, which is an indicator for the ratio of the amplitude of the variable component between the input shaft and the output shaft, or a phase lag, which is an indicator for difference in phase of the variable component, is used. It is possible to improve the control responsiveness and reduce the computation load of the control device and to improve the power transmission efficiency of the continuously variable transmission while preventing the endless belt thereof from slipping.

4 Claims, 18 Drawing Sheets

(51) Int. Cl.
*F16H 59/14* (2006.01)
*F16H 61/02* (2006.01)
*F16H 59/46* (2006.01)

(56) References Cited

U.S. PATENT DOCUMENTS 7,261,672 B2 * 8/2007 Frank et al. .................. 477/45
2004/0254047 A1 12/2004 Frank et al.

FOREIGN PATENT DOCUMENTS

| | | |
|---|---|---|
| JP | 2006-523292 A | 10/2006 |
| JP | 2007-085396 A | 4/2007 |
| JP | 2009-243683 A | 10/2009 |

OTHER PUBLICATIONS

Japanese Decision to Grant a Patent dated Jan. 7, 2015, issued in Japanese Application no. 2013-527926. (3 pp.).

* cited by examiner

FIG.17
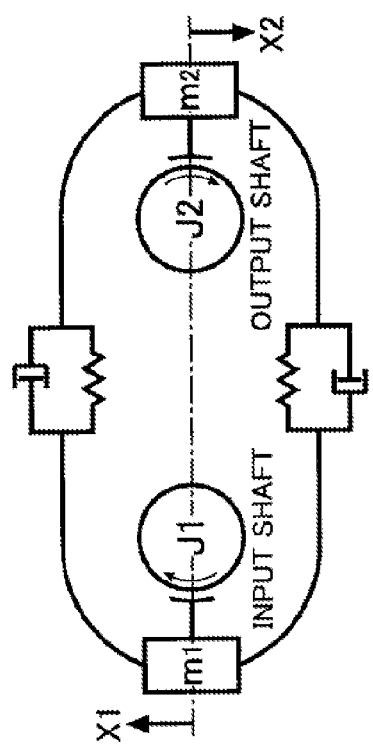
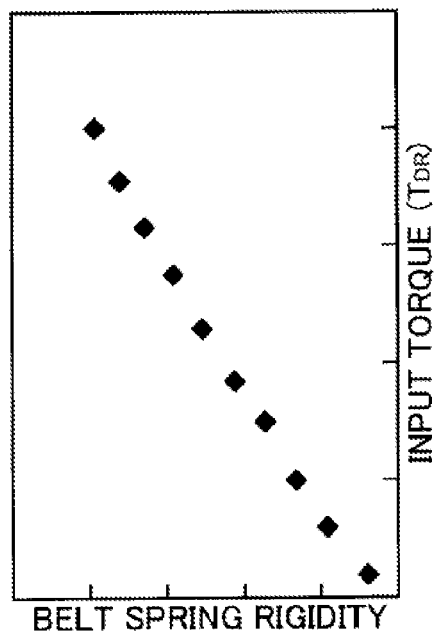
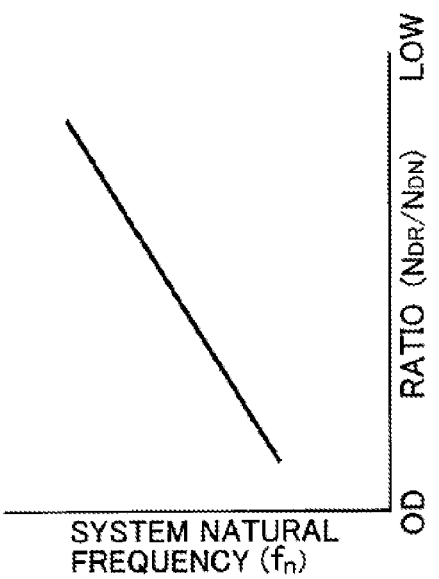

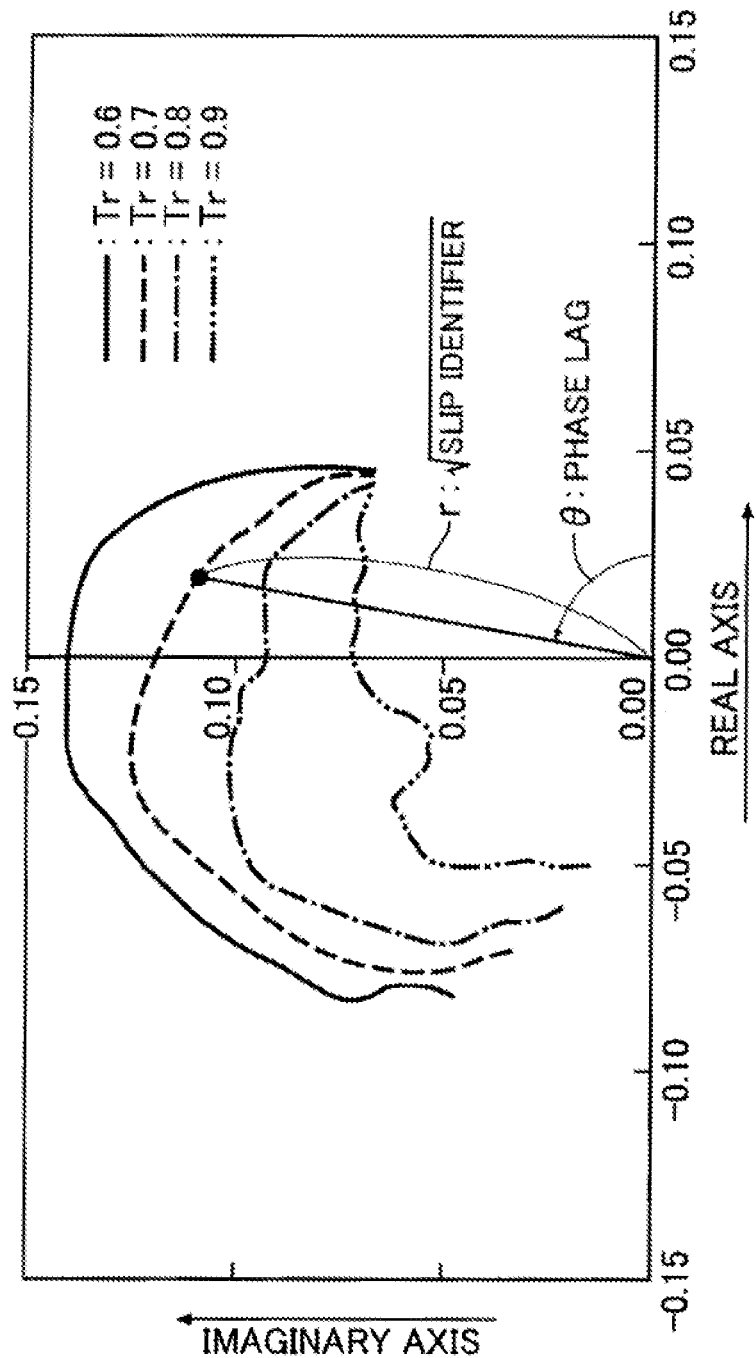

COMPRESSION CONTROL DEVICE FOR CONTINUOUSLY VARIABLE TRANSMISSION

TECHNICAL FIELD

The present invention relates to a compression control device for a continuously variable transmission that carries out power transmission, via a power transmission element, between an input shaft element provided on an input shaft and an output shaft element provided on an output shaft, in which in order to improve the power transmission efficiency while preventing the power transmission element from slipping, compression of one of the input shaft element and the output shaft element is controlled.

BACKGROUND ART

There is known from Patent Document 1 below a belt type continuously variable transmission in which an endless belt is wound around a drive pulley provided on an input shaft and a driven pulley provided on an output shaft, and gear shifting is carried out by changing the groove width of the two pulleys by gear shift hydraulic pressure, wherein power transmission efficiency is improved by controlling pulley lateral pressure applied to the pulleys based on parameters such as a slip identifier IDslip and a phase lag $\Delta\phi$, which are introduced while noting the occurrence of a difference in amplitude or phase between a variable component of the input shaft and a variable component of the output shaft due to slip of the endless belt.

RELATED ART DOCUMENTS

Patent Document

Patent Document 1: Japanese Patent Application Laid-open No. 2009-243683

SUMMARY OF THE INVENTION

Problems to be Solved by the Invention

The power transmission efficiency of a belt type continuously variable transmission is closely related to a parameter called torque ratio Tr, which is described later, and since in the above-mentioned arrangement the torque ratio Tr is indirectly controlled using a slip identifier IDslip or a phase lag $\Delta\phi$ as a parameter, it is difficult to control the torque ratio Tr so as to be a desired value with good responsiveness, and it is impossible to sufficiently enhance the power transmission efficiency of the belt type continuously variable transmission.

The present invention has been accomplished in light of the above-mentioned circumstances, and it is an object thereof to improve the power transmission efficiency of a continuously variable transmission while preventing a power transmission element from slipping.

Means for Solving the Problems

In order to attain the above object, according to a first aspect of the present invention, there is provided a compression control device for a continuously variable transmission, comprising: an input shaft to which the driving force of a drive source is inputted; an input shaft element that is provided on the input shaft; an output shaft via which the driving force of the drive source is changed in speed and outputted; an output shaft element that is provided on the output shaft; a power transmission element that is in contact with each of the input and output shaft elements and transmits the driving force from the input shaft to the output shaft by virtue of friction in contacting portions, torque ratio estimation means that estimates a torque ratio, which is the ratio of an actually transmitted torque relative to a maximum transmittable torque, based on characteristics of transmission of a given variable component of the input shaft to the output shaft, compression control means that controls compression of either one shaft element of the input and output shaft elements; and coefficient of friction estimation means that estimates a coefficient of friction between the either one shaft element and the power transmission element, wherein the torque ratio estimating means estimates the torque ratio from at least one of a slip identifier, which is an indicator for the ratio of an amplitude of the variable component between the input shaft and the output shaft, and a phase lag, which is an indicator for difference in phase of the variable component between the input shaft and the output shaft, the coefficient of friction estimation means estimates the coefficient of friction based on the torque ratio, and the compression control means determines a necessary axial thrust of the either one shaft element based on the coefficient of friction and controls the compression of the either one shaft element based on the necessary axial thrust.

Further, according to a second aspect of the present invention, in addition to the first aspect, wherein the device comprises load torque estimation means that estimates a load torque of the drive source, and the coefficient of friction estimation means estimates the coefficient of friction based on the load torque and the axial thrust of the either one shaft element.

Furthermore, according to a third aspect of the present invention, in addition to the first or second aspect, the device comprises cruise determination means that determines whether or not a moving object equipped with the drive source and the continuously variable transmission is cruising and coefficient of friction learning means that learns the coefficient of friction for each travel condition of the moving object when the moving object is in a cruise state.

Moreover, according to a fourth aspect of the present invention, in addition to any one of the first to third aspects, the compression control means determines the necessary axial thrust for the either one shaft element based on a target torque ratio and sets the target torque ratio at a low level when the amount of change of the torque ratio determined by the torque ratio estimation means goes outside a predetermined range.

Further, according to a fifth aspect of the present invention, in addition to any one of the first to fourth aspects, the device comprises an accelerator opening degree sensor that detects an accelerator opening degree, and the compression control means determines the necessary axial thrust for the either one shaft element based on a target torque ratio and sets the target torque ratio at a low level when the amount of change of the accelerator opening degree determined by the accelerator opening degree sensor goes outside a predetermined range.

It should be noted here that a drive pulley 13 of an embodiment corresponds to the input shaft element of the present invention, a driven pulley 14 of the embodiment corresponds to the output shaft element of the present invention, an endless belt 15 of the embodiment corresponds to the power transmission element of the present invention, an engine E of the embodiment corresponds to the drive source of the present invention, lateral pressure control means M2 of the embodiment corresponds to the compression control means of the present invention, a belt type continuously variable transmission TM of the embodiment corresponds to the continuously variable transmission of the present invention, and a pulley lateral pressure of the embodiment corresponds to the compression of the present invention.

Effects of the Invention

In accordance with the first aspect of the present invention, when estimating the torque ratio, which is the ratio of the actually transmitted torque relative to the maximum transmittable torque of the continuously variable transmission, based on the transmission characteristics for transmitting the given variable component of the input shaft to the output shaft via the power transmission element, since at least one of the slip identifier, which is an indicator for the ratio of the amplitude of the variable component between the input shaft and the output shaft, and the phase lag, which is an indicator for difference in phase of the variable component between the input shaft and the output shaft, is used, it is possible to estimate the torque ratio, which is very closely related to the power transmission efficiency of the continuously variable transmission, with good precision, thus improving the power transmission efficiency. Moreover, since the torque ratio is estimated from the slip identifier or the phase lag, it is possible to minimize the number of sensors necessary for estimation, thus reducing the cost. Furthermore, not only is it possible to carry out appropriate control by directly specifying the target torque ratio, but it is also possible to prevent the compression responsiveness from changing according to the frequency of the variable component.

Moreover, since the coefficient of friction estimation means estimates the coefficient of friction between the either one shaft element and the power transmission element and the compression control means determines the necessary axial thrust for the either one shaft element based on the coefficient of friction and controls the compression of the either one shaft element based on the necessary axial thrust, that is, the compression is controlled using the coefficient of friction, which is a parameter that directly rules the compression, compared with indirect control where the slip identifier or the phase lag itself is fed back, it becomes possible to improve the control responsiveness and reduce the computation load of the control device.

Furthermore, in accordance with the second aspect of the present invention, since the coefficient of friction estimation means estimates the coefficient of friction based on the load torque of the drive source estimated by the load torque estimation means and the axial thrust of the either one shaft element, it is possible to estimate the coefficient of friction with good precision.

Moreover, in accordance with the third aspect of the present invention, since the cruise determination means determines whether or not a moving object equipped with the drive source and the continuously variable transmission is cruising and the coefficient of friction learning means learns the coefficient of friction when the moving object is in the cruise state, not only is it possible to continue compression control with good precision even in a case in which it has become temporarily impossible to estimate the coefficient of friction for some reason as long as the time is short enough that a change over time does not occur, and it is also possible to enhance the convergence to the target torque ratio compared with a case in which learning is not carried out.

Furthermore, in accordance with the fourth aspect of the present invention, since the compression control means determines the necessary axial thrust for the either one shaft element based on the target torque ratio and sets the target torque ratio at a low level when the amount of change of the estimated torque ratio goes outside a predetermined range, when there is a possibility that the continuously variable transmission will experience slip due to a load from the road surface while traveling on a bad road, etc., the target torque ratio is set at a low level to thus increase the compression, thereby protecting the continuously variable transmission.

Moreover, in accordance with the fifth aspect of the present invention, since the compression control means determines the necessary axial thrust for the either one shaft element based on the target torque ratio and sets the target torque ratio at a low level when the amount of change of the accelerator opening degree goes outside a predetermined range, when there is a possibility that the continuously variable transmission will experience slip due to the accelerator pedal being operated rapidly, the target torque ratio is set at a low level to thus increase the compression, thereby protecting the continuously variable transmission.

BRIEF DESCRIPTION OF DRAWINGS

FIG. 17 is a diagram for explaining the reason why the natural frequency of a system changes. (third embodiment)

FIG. 18 is a diagram for explaining torque ratio estimation means. (fourth embodiment)

EXPLANATION OF REFERENCE NUMERALS AND SYMBOLS

11 Input shaft
12 Output shaft
13 Drive pulley (input shaft element)
14 Driven pulley (output shaft element)
15 Endless belt (power transmission element)
AP Accelerator opening degree
E Engine (drive source)
IDslip Slip identifier M1 Torque ratio estimation means
M2 Lateral pressure control means (compression control means)
M3 Coefficient of friction estimation means
M4 Coefficient of friction learning means
M7 Load torque estimation means
M9 Cruise determination means
Q Necessary axial thrust
Se Accelerator opening degree sensor
STr Target torque ratio
T Transmitted torque (load torque)
TM Belt type continuously variable transmission (continuously variable transmission)
Tmax Maximum transmittable torque
Tr Torque ratio
Δφ Phase lag
μ Coefficient of friction

MODES FOR CARRYING OUT THE INVENTION

A first embodiment of the present invention is explained below by reference to FIG. 1 to FIG. 14.

First Embodiment

Figure 1:
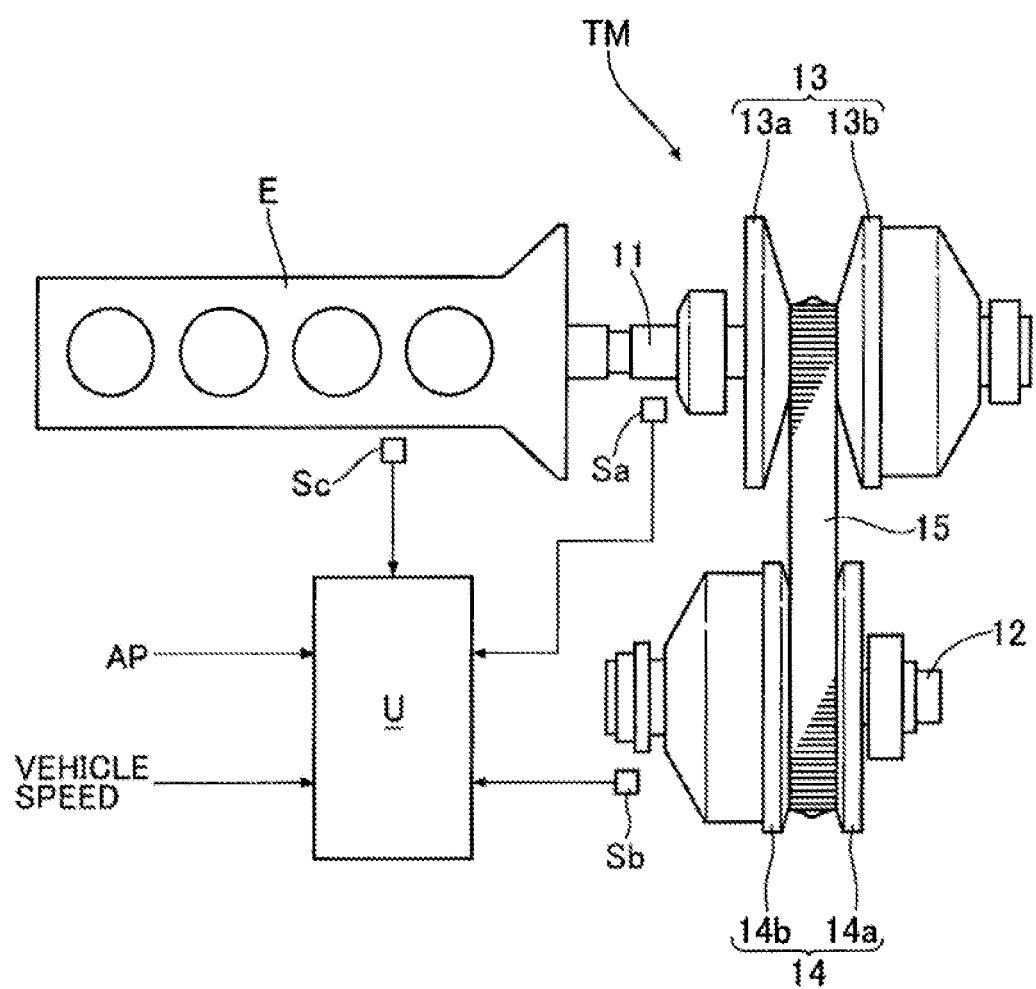
FIG. 1 is a diagram showing the overall structure of a belt type continuously variable transmission. (first embodiment)

As shown in FIG. 1, a belt type continuously variable transmission TM mounted on an automobile includes an input shaft 11 connected to an engine E, an output shaft 12 disposed in parallel to the input shaft 11, a drive pulley 13 provided on the input shaft 11, a driven pulley 14 provided on the output shaft 12, and an endless belt 15 made of metal and wound around the drive pulley 13 and the driven pulley 14. The drive pulley 13 is formed from a fixed side pulley half 13a and a movable side pulley half 13b, and the movable side pulley half 13b is urged by pulley lateral pressure in the direction in which it moves closer to the fixed side pulley half 13a. Similarly, the driven pulley 14 is formed from a fixed side pulley half 14a and a movable side pulley half 14b, and the movable side pulley half 14b is urged by pulley lateral pressure in the direction in which it moves closer to the fixed side pulley half 14a. Therefore, by controlling the pulley lateral pressure acting on the movable side pulley half 13b of the drive pulley 13 and the movable side pulley half 14b of the driven pulley 14 so as to increase the groove width of one of the drive pulley 13 and the driven pulley 14 and decrease the groove width of the other, the gear ratio of the belt type continuously variable transmission TM can be freely changed.

Inputted into an electronic control unit U for controlling the gear ratio of the belt type continuously variable transmission TM are a rotational speed of the input shaft 11 detected by an input shaft rotational speed sensor Sa, a rotational speed of the output shaft 12 detected by an output shaft rotational speed sensor Sb, and a rotational speed of the engine E detected by an engine rotational speed sensor Sc, together with an accelerator opening degree signal, a vehicle speed signal, etc. The electronic control unit U not only carries out normal gear ratio control in which the pulley lateral pressure of the belt type continuously variable transmission TM is changed based on the accelerator opening degree signal and the vehicle speed signal but also estimates a torque ratio Tr, which is described later, and carries out control in which the pulley lateral pressure is changed using the torque ratio Tr in order to enhance the power transmission efficiency of the belt type continuously variable transmission TM.

Figure 2:
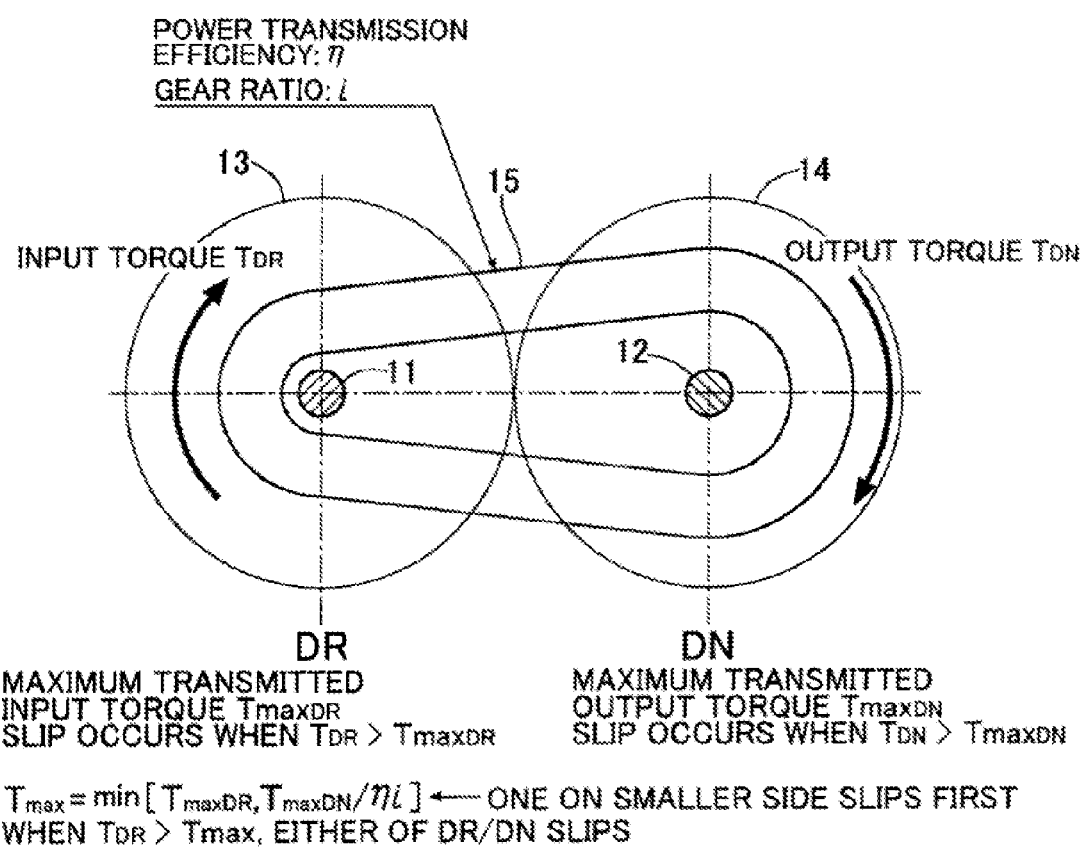
FIG. 2 is a diagram for explaining transmission control and lateral pressure control of the belt type continuously variable transmission. (first embodiment)

As shown in FIG. 2, when the input torque of the belt type continuously variable transmission TM is $T_{DR}$, the output torque is $T_{DN}$, the maximum transmitted input torque, that is, the input torque $T_{DR}$ at the instant when slip occurs between the drive pulley 13 and the endless belt 15, is $Tmax_{DR}$, the maximum transmitted output torque, that is, the output torque $T_{DN}$ at the instant when slip occurs between the driven pulley 14 and the endless belt 15, is $Tmax_{DN}$, the power transmission efficiency is i, and the gear ratio is i, the maximum transmitted torque Tmax of the belt type continuously variable transmission TM is the smaller of $Tmax_{DR}$ and $Tmax_{DN}/\eta i$, and when $T_{DR}$>Tmax, either the drive pulley 13 or the driven pulley 14 slips.

Figure 3:
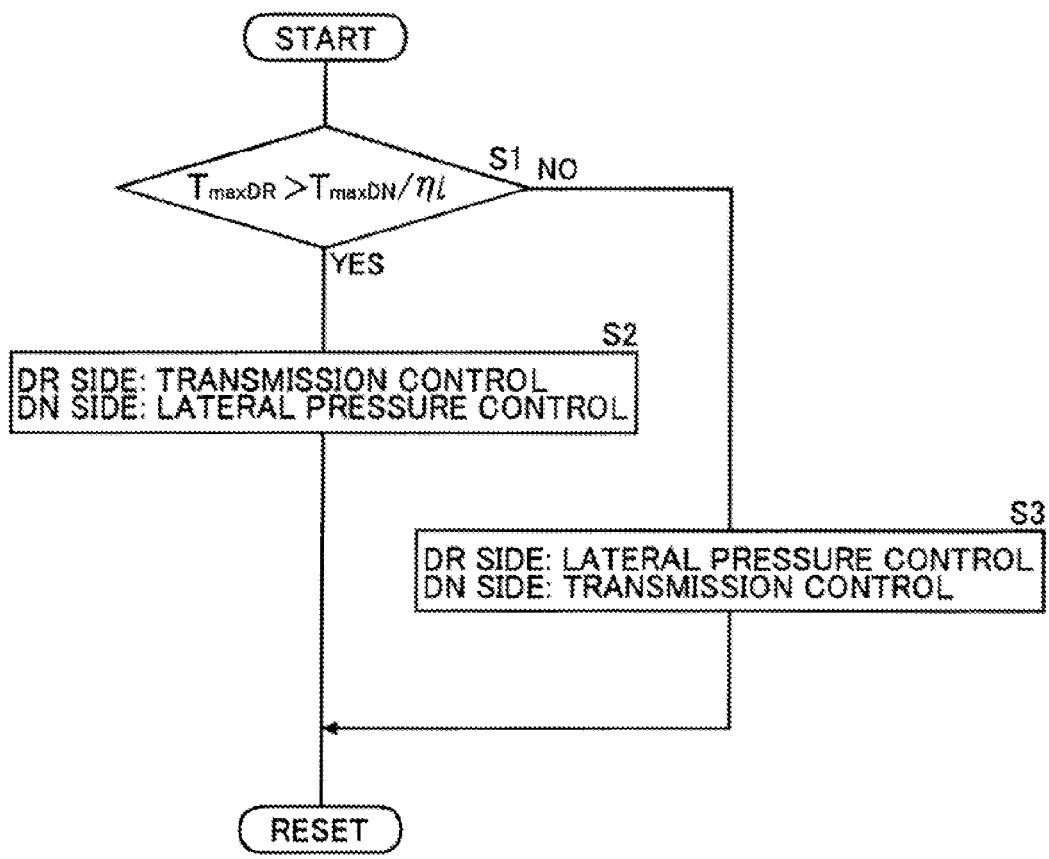
FIG. 3 is a flowchart for determining transmission control and lateral pressure control of a pulley. (first embodiment)

As shown in the flowchart of FIG. 3, for example, if in step S1 $Tmax_{DR}$>$Tmax_{DN}/\eta i$, since slip occurs in the driven pulley 14 at the instant when output torque $T_{DN}$>maximum transmitted output torque $Tmax_{DN}$, in step S2 in order to control the gear ratio of the belt type continuously variable transmission TM the lateral pressure of the drive pulley 13 is changed (transmission control), and in order to prevent the driven pulley 14 from slipping the lateral pressure of the driven pulley 14 is controlled (lateral pressure control).

On the other hand, if in step S1 above $Tmax_{DR}\leq Tmax_{DN}/\eta i$, since slip occurs in the drive pulley 13 at the instant when input torque $T_{DR}$>maximum transmitted input torque $Tmax_{DR}$, in step S3 in order to control the gear ratio of the belt type continuously variable transmission TM the lateral pressure of the driven pulley 14 is changed (transmission control), and in order to prevent the drive pulley 13 from slipping the lateral pressure of the drive pulley 13 is controlled (lateral pressure control).

The invention of the present application relates to lateral pressure control in order to prevent slip between the drive pulley 13 and the endless belt 15 or between the driven pulley 14 and the endless belt 15 described above.

Figure 4:
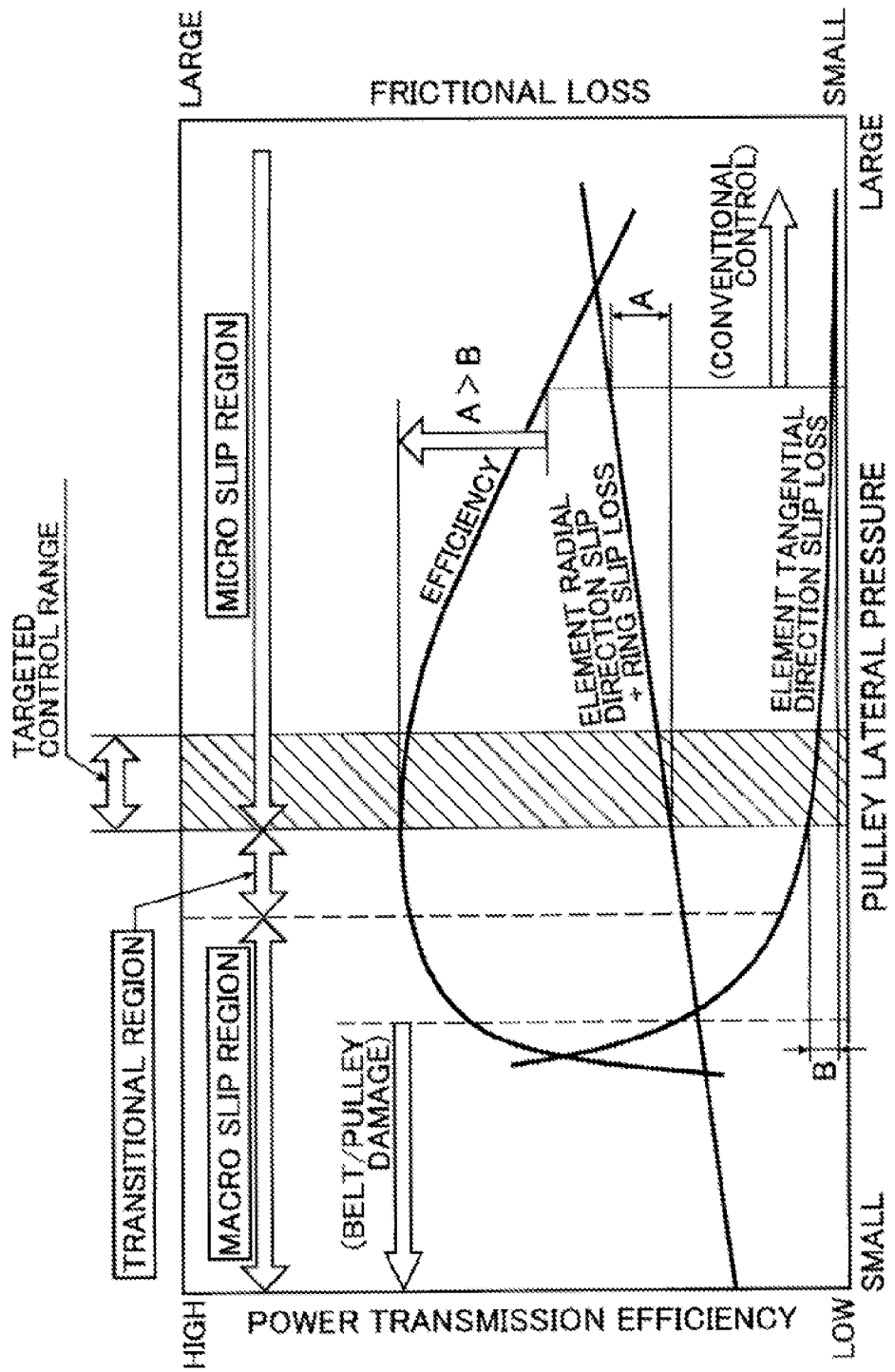
FIG. 4 is a graph showing the relationship between pulley lateral pressure and power transmission efficiency. (first embodiment)

As one means for enhancing the power transmission efficiency of the belt type continuously variable transmission TM, decreasing the pulley lateral pressure applied to the pulley is known. FIG. 4 shows the relationship between pulley lateral pressure and frictional loss and power transmission efficiency; as the pulley lateral pressure decreases, there is a shift from a micro slip region, in which slip between the pulley and the endless belt is small, to a macro slip region, in which slip between the pulley and the endless belt is large, via a transitional region. In the micro slip region, the power transmission efficiency gradually improves as the pulley lateral pressure decreases, but in the transitional region the power transmission efficiency starts decreasing and in the macro slip region the power transmission efficiency decreases rapidly.

The reason therefor is thought to be that, although the sum of frictional losses due to slip of a metal ring and slip in the radial direction of a metal element of the endless belt decreases from the micro slip region to the macro slip region at a rate of decrease A, which is constant and relatively large, as the pulley lateral pressure decreases, the frictional loss due to slip in the tangential direction of the metal element increases from the micro slip region to the transitional region at a rate of increase B (A>B), which is substantially constant and relatively small, and rapidly increases in the macro slip region.

In order to obtain maximum power transmission efficiency, it is desirable to control the pulley lateral pressure so that it is in the micro slip region just before the transitional region, but if the pulley lateral pressure is decreased excessively, it shifts from the micro slip region into the macro slip region beyond the transitional region, and there is a possibility that there will be a large amount of slip of the endless belt relative to the pulley and the endless belt will be damaged. Therefore, in order to enhance the power transmission efficiency while ensuring the durability of the belt type continuously variable transmission TM, it is necessary to control the pulley lateral pressure with good precision so that it is in the micro slip region just before the transitional region.

Because of this, in the present invention, a parameter called torque ratio Tr is introduced. The torque ratio Tr is defined by $$Tr=T/Tmax \quad (1)$$

in which T is the torque that is currently being transmitted by the belt type continuously variable transmission TM (coinciding with the input torque $T_{DR}$ except a case in which extreme slip is occurring) and Tmax is the maximum torque that can be transmitted by the belt type continuously variable transmission TM with the current axial thrust (that is, pulley lateral pressure×pulley piston pressure-receiving area) without slipping. A torque ratio Tr=0 corresponds to a state in which no power transmission is being carried out, a torque ratio Tr=1 corresponds to a state in which the torque that is currently being transmitted is saturated, and a torque ratio Tr>1 corresponds to a state in which macro slip might occur or transition thereto is occurring.

Figure 5:
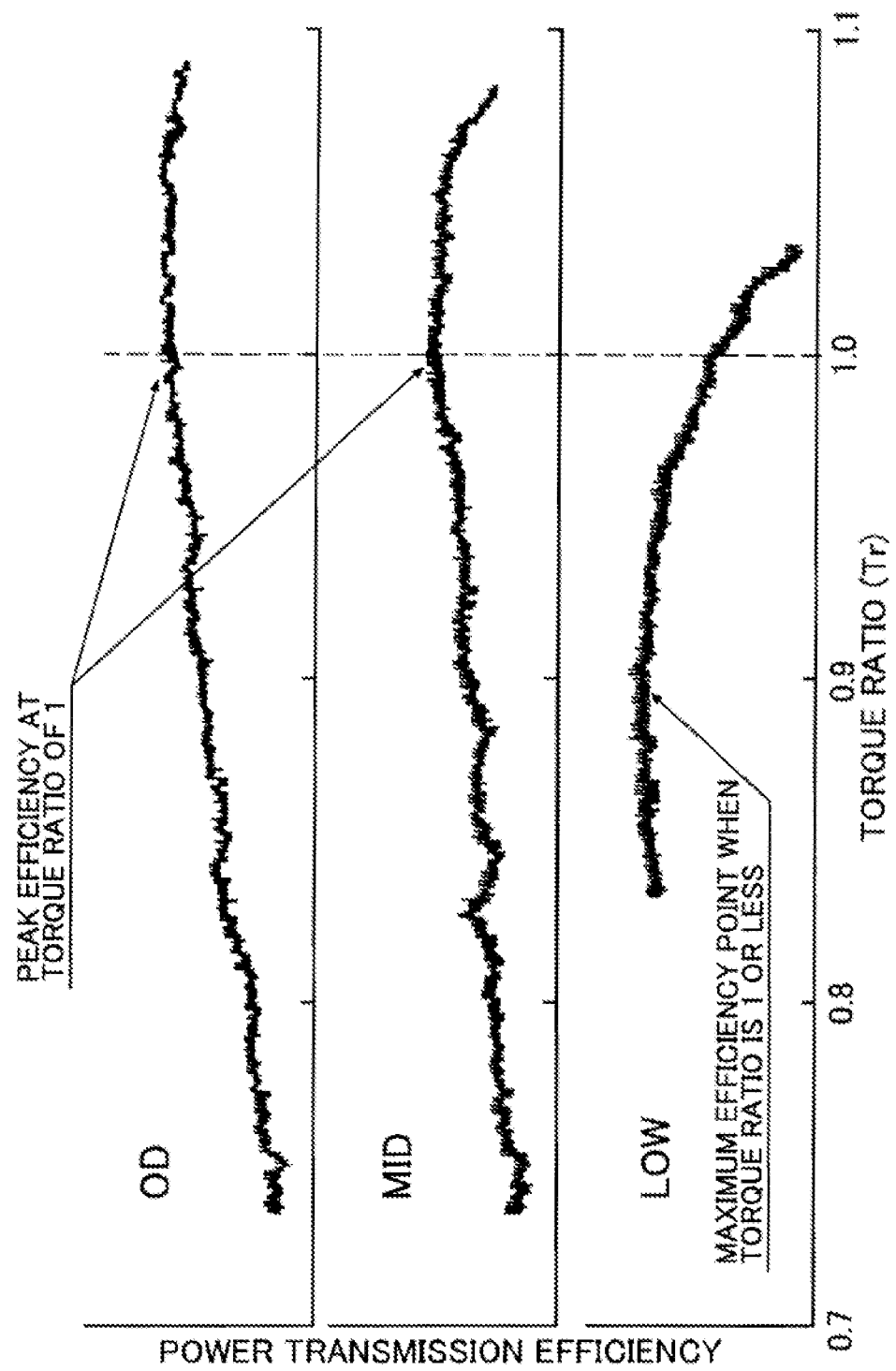
FIG. 5 is a graph showing the relationship between torque ratio and power transmission efficiency. (first embodiment)

As shown in FIG. 5, when the gear ratio is in an OD state and in a MID state, maximum power transmission efficiency is obtained when the torque ratio Tr is 1.0. Furthermore, it can be seen that when the gear ratio is in a LOW state, the torque ratio Tr that gives maximum power transmission efficiency decreases to 0.9, but high power transmission efficiency can still be obtained even when the torque ratio Tr is 1.0. That is, the parameter called torque ratio Tr is very closely related to power transmission efficiency, and controlling the pulley lateral pressure of the belt type continuously variable transmission TM so that the torque ratio Tr is a value close to 1.0 enables the power transmission efficiency to be enhanced and the occurrence of macro slip to be prevented, thus ensuring the durability of the belt type continuously variable transmission TM.

The maximum transmittable torque Tmax necessary for calculating the torque ratio Tr is given by $$Tmax=2\mu RQ/\cos \alpha \quad (2)$$

when the drive pulley 13 is subjected to lateral pressure control, that is, the drive pulley 13 slips, and $$Tmax=2\mu RQ/\eta i \cos \alpha \quad (3)$$

when the driven pulley 14 is subjected to lateral pressure control, that is, the driven pulley 14 slips. Here, μ is the coefficient of friction between the endless belt 15 and the pulley 13 or 14 on the side that is subjected to lateral pressure control, R is the winding radius of the endless belt 15 relative to the pulley 13 or 14 on the side that is subjected to lateral pressure control, Q is the axial thrust of the pulley 13 or 14 on the side that is subjected to lateral pressure control α is an angle that is half the V angle of the pulley 13 or 14, η is the power transmission efficiency of the belt type continuously variable transmission TM, and i is the gear ratio.

In this way, in order to calculate the torque ratio Tr it is necessary to calculate the maximum transmittable torque Tmax, in order to calculate the maximum transmittable torque Tmax it is necessary to detect the coefficient of friction μ between the pulley 13, 14 and the endless belt 15, the winding radius R of the endless belt 15 relative to the pulley 13, 14, and the axial thrust Q of the pulley 13, 14, and a large number of sensors are therefore required. In particular, since in addition to the coefficient of friction changing over time, there is a necessity to first generate macro slip in order to measure the coefficient of friction, it is generally difficult to measure the coefficient of friction while the actual vehicle is traveling.

The present embodiment estimates the torque ratio Tr from a slip identifier IDslip and a frequency $f_0$ of variation in rotational speed of the input shaft 11 (frequency $f_0$ of variable component) or from a phase lag Δϕ and a frequency $f_0$ of variation in rotational speed of the input shaft 11 (frequency $f_0$ of variable component). Since the variation in rotational speed of the input shaft 11 is synchronized with variation in the rotational speed of the engine E, the frequency $f_0$ of the variation in rotational speed of the input shaft 11 can be calculated from the engine rotational speed detected by the engine rotational speed sensor Sc, and since as described later the slip identifier IDslip and the phase lag Δϕ can be calculated from the variation in input shaft rotational speed detected by the input shaft rotational speed sensor Sa and the variation in output shaft rotational speed detected by the output shaft rotational speed sensor Sb, it is possible to estimate the torque ratio Tr by means of a minimum number of sensors with good precision.

Figure 6:
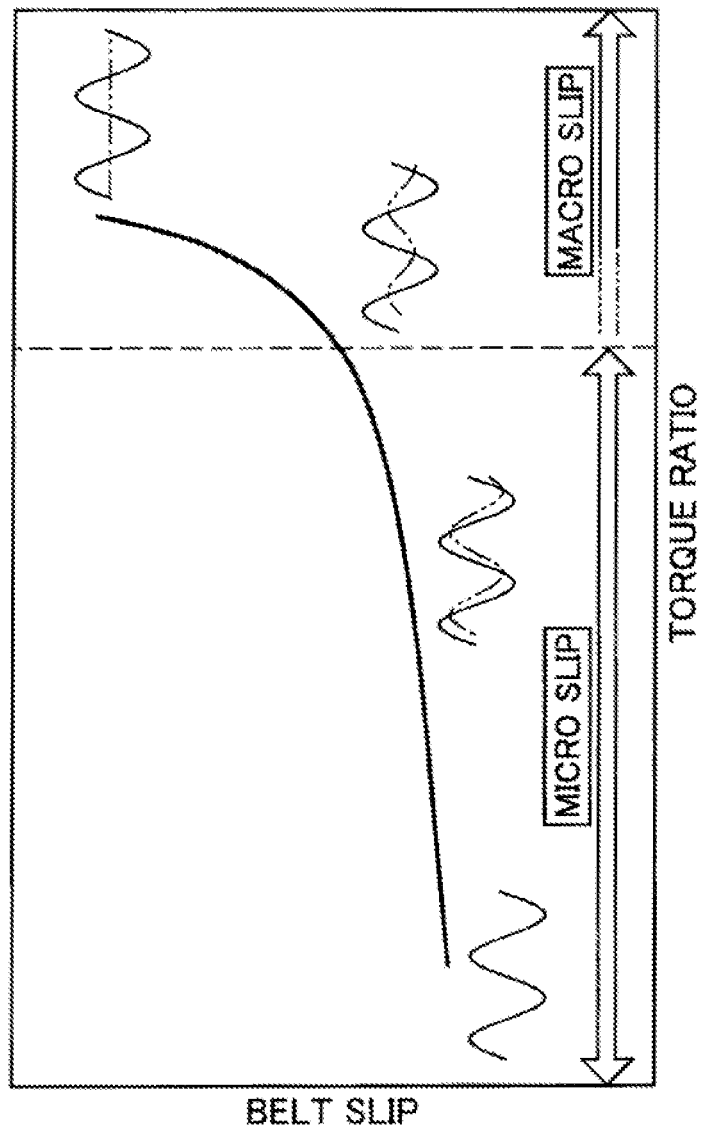
FIG. 6 is a diagram showing the relationship between torque ratio and belt slip. (first embodiment)

The slip identifier IDslip and the phase lag Δϕ are now explained. As shown in FIG. 6, accompanying an increase in the torque ratio Tr, the amount of slip of the belt increases in the micro slip region little by little, and in the macro slip region the amount of slip of the belt increases rapidly. Since the variation in rotational speed of the input shaft 11 is transmitted via the endless belt 15 to the output shaft 12, which is connected to the input shaft 11 via the endless belt 15, a variation in rotational speed with the same frequency is generated in the output shaft 12. When there is no slip at all between the belt and the pulley, variation of the input shaft rotational speed is transmitted to the output shaft without being damped, but if the amount of slip increases accompanying an increase in the torque ratio Tr, the amplitude of the waveform of the output shaft rotational speed variation becomes small relative to the amplitude of the waveform of the input shaft rotational speed variation, and the phase of the waveform of the output shaft rotational speed variation lags relative to the phase of the waveform of the input shaft rotational speed variation.

Figure 7:
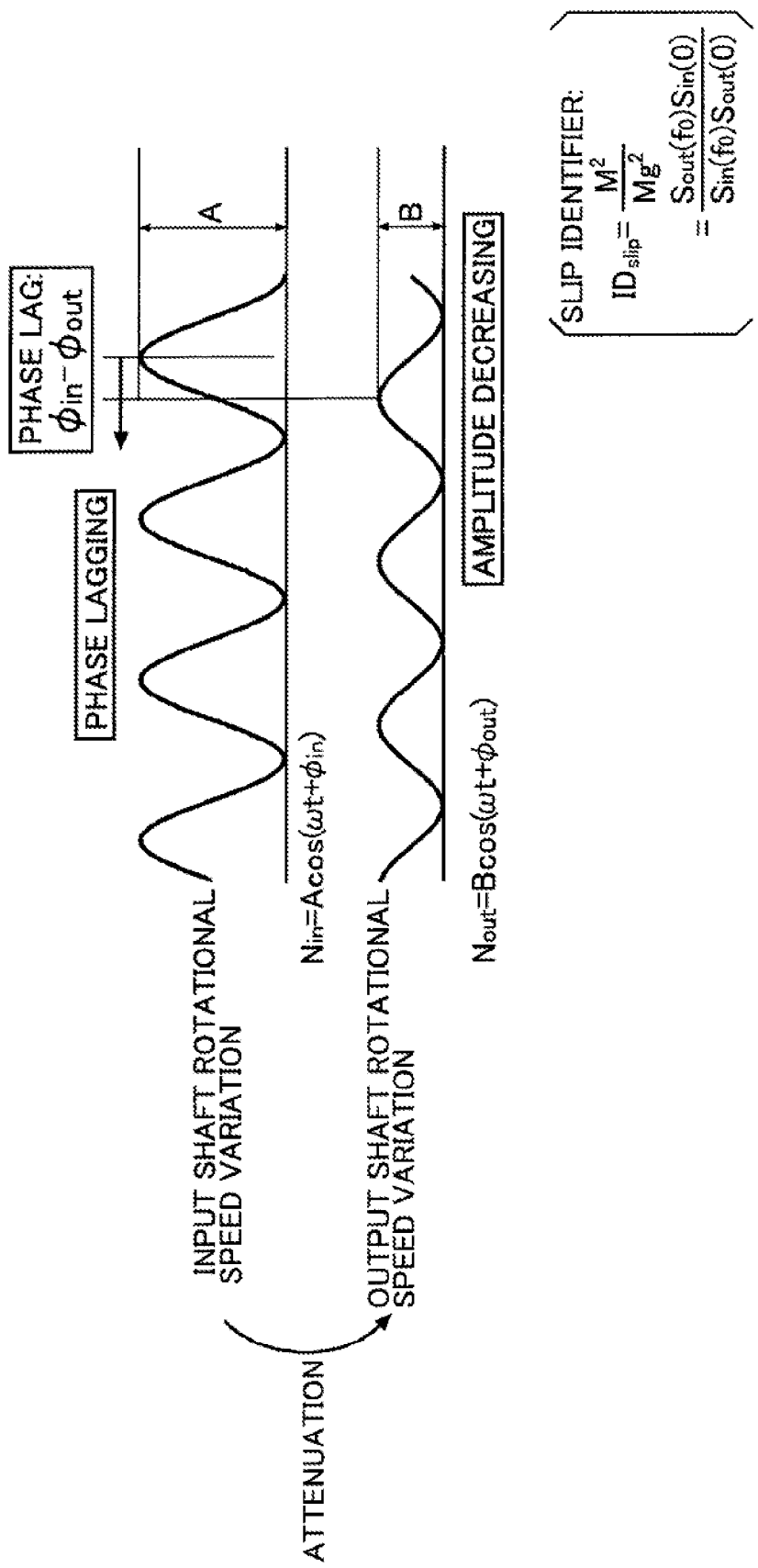
FIG. 7 is a diagram showing the waveform of input shaft rotational speed variation and the waveform of output shaft rotational speed variation. (first embodiment)

In FIG. 6 and FIG. 7, it can be seen that, with respect to the waveform of the input shaft rotational speed variation shown by the solid line, the waveform of the output shaft rotational speed variation shown by the broken line gradually decreases in amplitude and gradually lags in phase in response to an increase in the torque ratio Tr. The oscillatory waveform of the input shaft rotational speed is given by $$Nin=A \cos(\omega t+\phi in) \quad (4),$$

and the oscillatory waveform of the output shaft rotational speed is given by $$Nout=B \cos(\omega t+\phi out) \quad (5).$$

That is, with respect to the oscillatory waveform of the input shaft rotational speed, the oscillatory waveform of the output shaft rotational speed decreases in amplitude from A to B and lags in phase only by ϕin −ϕout.

A method for calculating the slip identifier IDslip is now explained.

First, the frequency $f_0$ of variation of the rotational speed of the input shaft 11 is calculated from the equation below using a number n of cylinders of the engine E and a direct current component Ne of the engine rotational speed. The direct current component Ne of the engine rotational speed can be detected by the engine rotational speed sensor Sc, which is always mounted on a normal engine E.

[Equation 1]

$$f_0 = \frac{nNe}{120} [Hz] \quad (6)$$

n: number of cylinders of engine
Ne: direct current component [rpm] of engine rotational speed The slip identifier IDslip is formed by standardizing an amplitude ratio M between the input shaft 11 and the output shaft 12 at the frequency $f_0$ of variation using an amplitude ratio Mg when there is no geometric response from the belt type continuously variable transmission TM, that is, there is no influence from slip or excitation, and is defined by the equation below.

[Equation 2]

$$ID_{slip} = \left(\frac{M}{Mg}\right)^2 \quad (7)$$

M: amplitude ratio
Mg: amplitude ratio determined by geometric conditions

The amplitude ratio M, which is a function of the frequency $f_0$ of variation of the rotational speed of the input shaft 11, is defined by the equation below; the frequency $f_0$ of variation can be calculated from the engine rotational speed outputted by the engine rotational speed sensor Sc, Sin($f_0$) is a power spectrum of the waveform of the input shaft rotational speed variation and can be calculated from the output of the input shaft rotational speed sensor Sa, and Sout ($f_0$) is a power spectrum of the waveform of the output shaft rotational speed variation and can be calculated from the output of the output shaft rotational speed sensor Sb.

[Equation 3]

$$M(f_0) = \sqrt{\frac{S_{out}(f_0)}{S_{in}(f_0)}} \quad (8)$$

$S_{in}$: power spectrum of variation of input shaft
$S_{out}$: power spectrum of variation of output shaft Furthermore, the amplitude ratio Mg under geometric conditions is approximately represented by the ratio of direct current components of the output signal and input signal when slip occurring in the belt type continuously variable transmission TM is small, and is defined by the equation below.

[Equation 4]

$$Mg = \sqrt{\frac{S_{out}(0)}{S_{in}(0)}} \quad (9)$$

The amplitude ratio Mg under geometric conditions depends on the physical quantity used as the variable component of the input shaft 11 and the output shaft 12. Since in the present embodiment the rotational speed variation is used as the variable component, Mg=1/i where the gear ratio of the belt type continuously variable transmission TM is i. When torque variation is used as the variable component of the input shaft 11 and the output shaft 12, Mg=i. The gear ratio i of the belt type continuously variable transmission TM can be calculated from the output of the input shaft rotational speed sensor Sa and the output of the output shaft rotational speed sensor Sb.

Based on the above, Equation (7) is rewritten so as to give the equation below, and the slip identifier IDslip can be calculated from outputs of the input shaft rotational speed sensor Sa and the output shaft rotational speed sensor Sb, which are already present in the belt type continuously variable transmission TM, and the output of the engine rotational speed sensor Sc, which is already present in the engine E.

[Equation 5]

$$ID_{slip} = \frac{S_{out}(f_0)S_{in}(0)}{S_{in}(f_0)S_{out}(0)} \quad (10)$$

Furthermore, the phase lag $\Delta\phi$ is defined by the equation below: the phase $\phi$in of the waveform of the input shaft rotational speed variation can be calculated from the output of the input shaft rotational speed sensor Sa, and the phase $\phi$out of the waveform of the output shaft rotational speed variation can be calculated from the output of the output shaft rotational speed sensor Sb.

[Equation 6]

$$\Delta\phi = \phi_{in}(f_0) - \phi_{out}(f_0) \quad (11)$$

Figure 8:
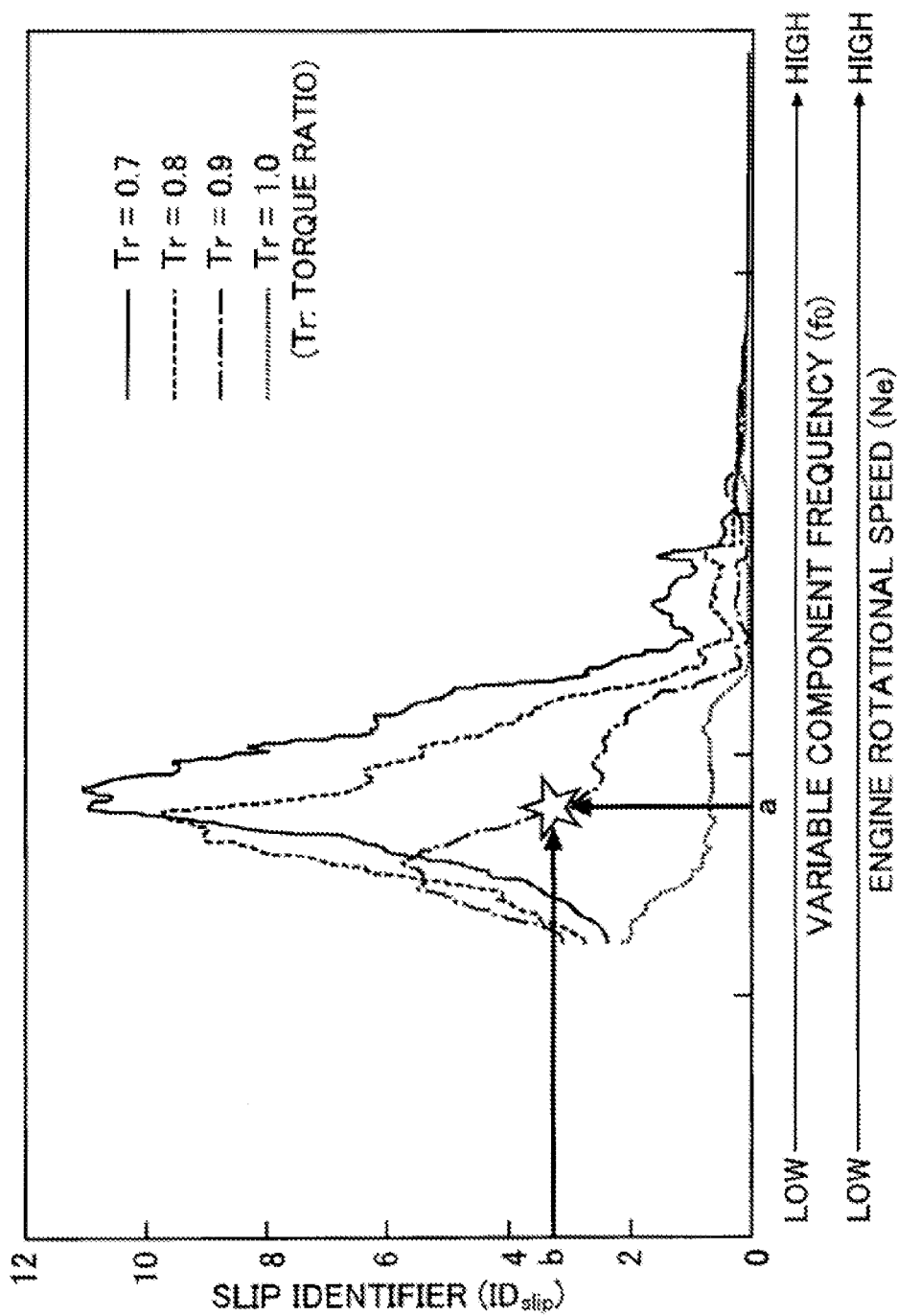
FIG. 8 is a diagram showing a map via which torque ratio is looked up from variable component frequency and slip identifier. (first embodiment)

$\phi_{in}$: phase of variation of input shaft
$\phi_{out}$: phase of variation of output shaft FIG. 8 is a map in which the abscissa is the frequency $f_0$ of the variable component of the input shaft rotational speed (or the engine rotational speed Ne) and the ordinate is the slip identifier IDslip; when the torque ratio Tr is changed to 0.7, 0.8, 0.9, or 1.0, the corresponding characteristic line of the slip identifier IDslip changes. From this map, when the slip identifier IDslip and the frequency $f_0$ of the variable component of the belt type continuously variable transmission TM are determined at a given time, it is possible to estimate the torque ratio Tr at the given time from these values. For example, when the value for the frequency $f_0$ of the variable component is a and the value for the slip identifier IDslip is b, the torque ratio Tr becomes 0.9, which corresponds to the line shown by the single dotted line.

Figure 9:
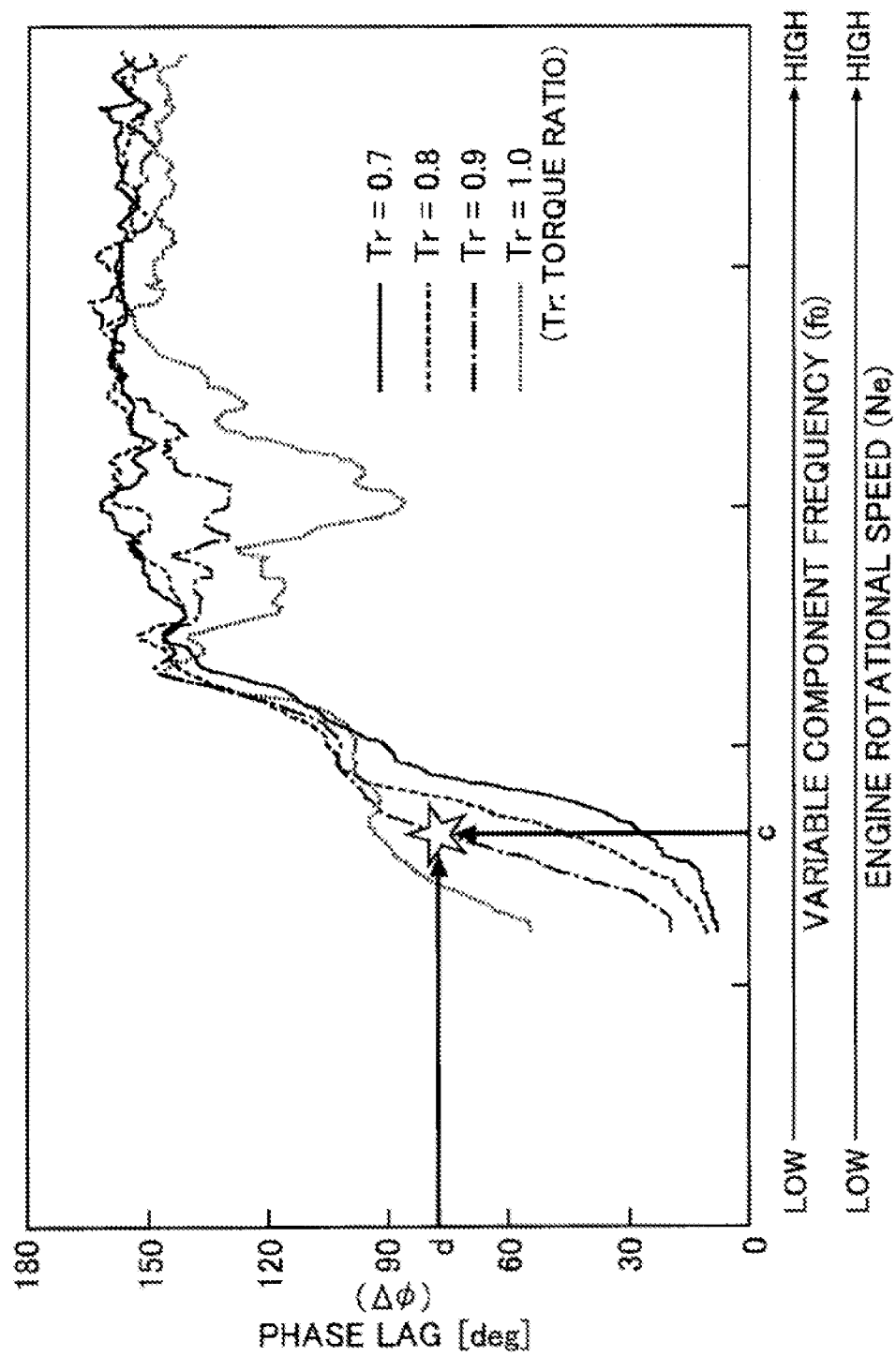
FIG. 9 is a diagram showing a map via which torque ratio is looked up from variable component frequency and phase lag. (first embodiment)

FIG. 9 is a map in which the abscissa is the frequency $f_0$ of the variable component of the input shaft rotational speed (or the engine rotational speed Ne) and the ordinate is the phase lag $\Delta\phi$: when the torque ratio Tr is changed to 0.7, 0.8, 0.9, or 1.0, the corresponding characteristic line of the phase lag $\Delta\phi$ changes. From this map, when the phase lag $\Delta\phi$ and the frequency $f_0$ of the variable component of the belt type continuously variable transmission TM are determined at a given time, it is possible to estimate the torque ratio Tr at the given time from these values. For example, when the value for the frequency $f_0$ of the variable component is c and the value for the phase lag $\Delta\phi$ is d, the torque ratio Tr becomes 0.9, which corresponds to the line shown by the single dotted line.

Figure 10:
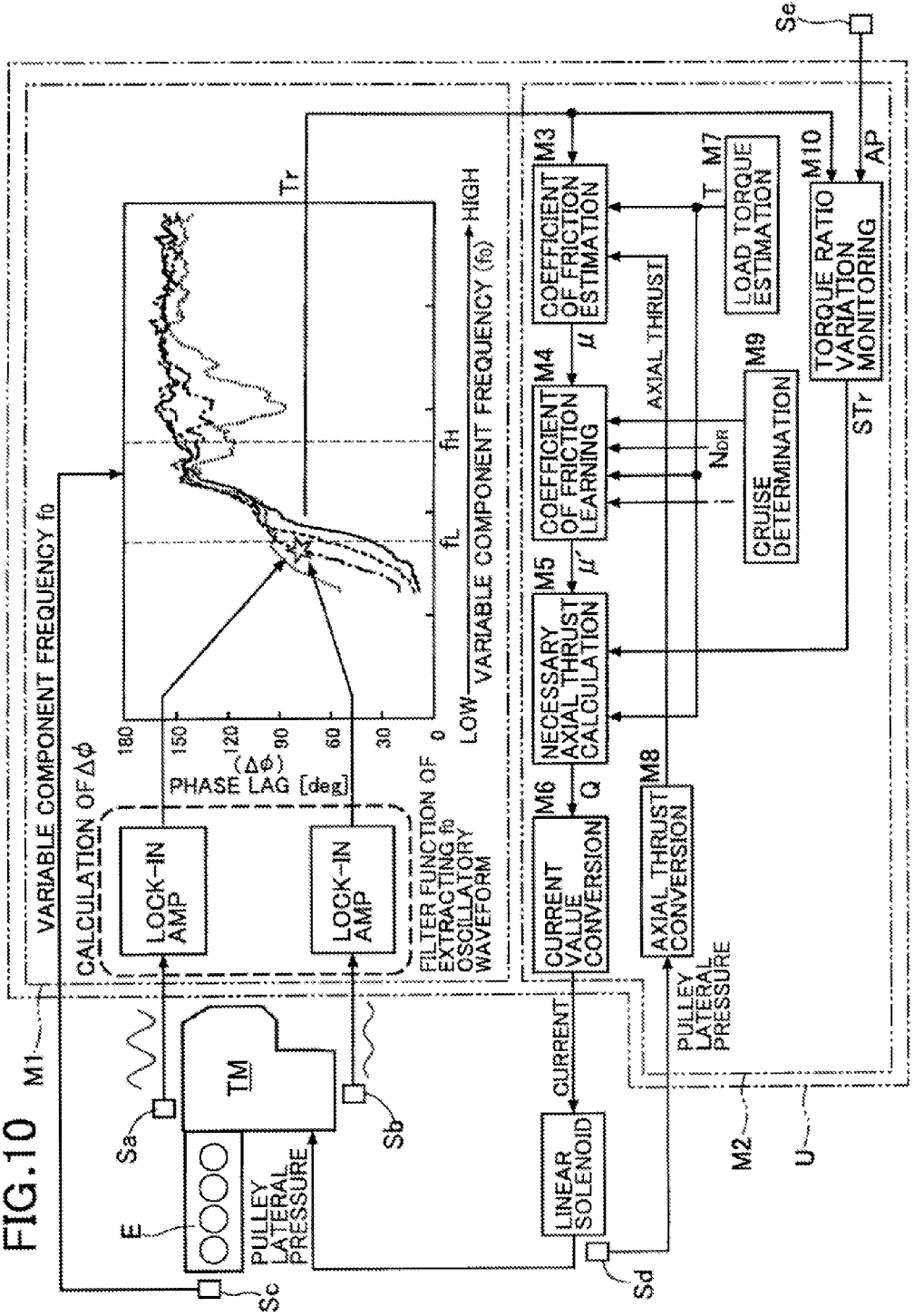
FIG. 10 is a block diagram for a pulley lateral pressure control system. (first embodiment)

As shown in FIG. 10, torque ratio estimation means M1 of the electronic control unit U calculates the frequency $f_0$ of the variable component corresponding to the engine rotational speed detected by the engine rotational speed sensor Sc, extracts an oscillatory waveform corresponding to the frequency $f_0$ by making outputs of the input shaft rotational speed sensor Sa and the output shaft rotational speed sensor Sb pass through a lock-in amp having a filter function, and calculates the slip identifier IDslip and the phase lag $\Delta\phi$ from these oscillatory waveforms on the input side and the output side. Subsequently, looking up from the map using the slip identifier IDslip or the phase lag $\Delta\phi$ (phase lag $\Delta\phi$ in the example of FIG. 10) and the frequency $f_0$ of the variable component as parameters allows the torque ratio Tr at the given time to be estimated.

Lateral pressure control means M2 of the electronic control unit U controls the pulley lateral pressure of the drive pulley 13 or the driven pulley 14 based on the torque ratio Tr estimated by the torque ratio estimation means M1. The arrangement and function of the lateral pressure control means M2 of the electronic control unit U are explained below.

As shown in FIG. 10, the lateral pressure control means M2 includes coefficient of friction estimation means M3, coefficient of friction leaning means M4, necessary axial thrust calculation means M5, current value conversion means M6, load torque estimation means M7, axial thrust conversion means M8, cruise determination means M9, and torque ratio variation monitoring means M10.

The coefficient of friction estimation means M3 estimates the coefficient of friction $\mu$ between the endless belt 15 and the pulley 13, 14 on the side that is subjected to lateral pressure control based on a torque ratio Tr estimated by the torque ratio estimation means M1, a load torque T estimated by the load torque estimation means M7 (corresponding to the load torque of the engine E or a torque that is currently being transmitted by the belt type continuously variable transmission TM), and an axial thrust of the pulley 13, 14 on the side that is subjected to lateral pressure control that has been converted by the axial thrust conversion means M8.

That is, the load torque estimation means M7 calculates the load torque T of the engine E (corresponding to the torque that is currently being transmitted by the belt type continuously variable transmission TM) from running conditions such as intake negative pressure of the engine E, and the axial thrust conversion means M8 converts the oil pressure of the pulley 13, 14 on the side that is subjected to lateral pressure control that has been detected by an oil pressure sensor Sd (see FIG. 10) to the corresponding axial thrust Q. The coefficient of friction estimation means M3 estimates the coefficient of friction $\mu$ between the endless belt 15 and the pulley 13, 14 that is subjected to lateral pressure control by applying the load torque T estimated by the load torque estimation means M7 and the axial thrust Q converted by the axial thrust conversion means M8 to the equations below.

$$\mu = T \cos \alpha / 2RQTr \quad (12)$$

$$\mu = T\eta i \cos \alpha / 2RQTr \quad (13)$$

In addition, equation (12) is used when the drive pulley 13 is subjected to lateral pressure control, and equation (13) is used when the driven pulley 14 is subjected to lateral pressure control. Furthermore, in equation (12) and equation (13), $\alpha$ is the angle that is half of the V angle of the pulley 13, 14, R is the winding radius of the endless belt 15 around the pulley 13, 14 on the side that is subjected to lateral pressure control, $\eta$ is the power transmission efficiency of the belt type continuously variable transmission TM, and i is the speed ratio.

Subsequently, the coefficient of friction $\mu$ estimated by the coefficient of friction estimation means M3 is learned by the coefficient of friction learning means M4.

Figure 11:
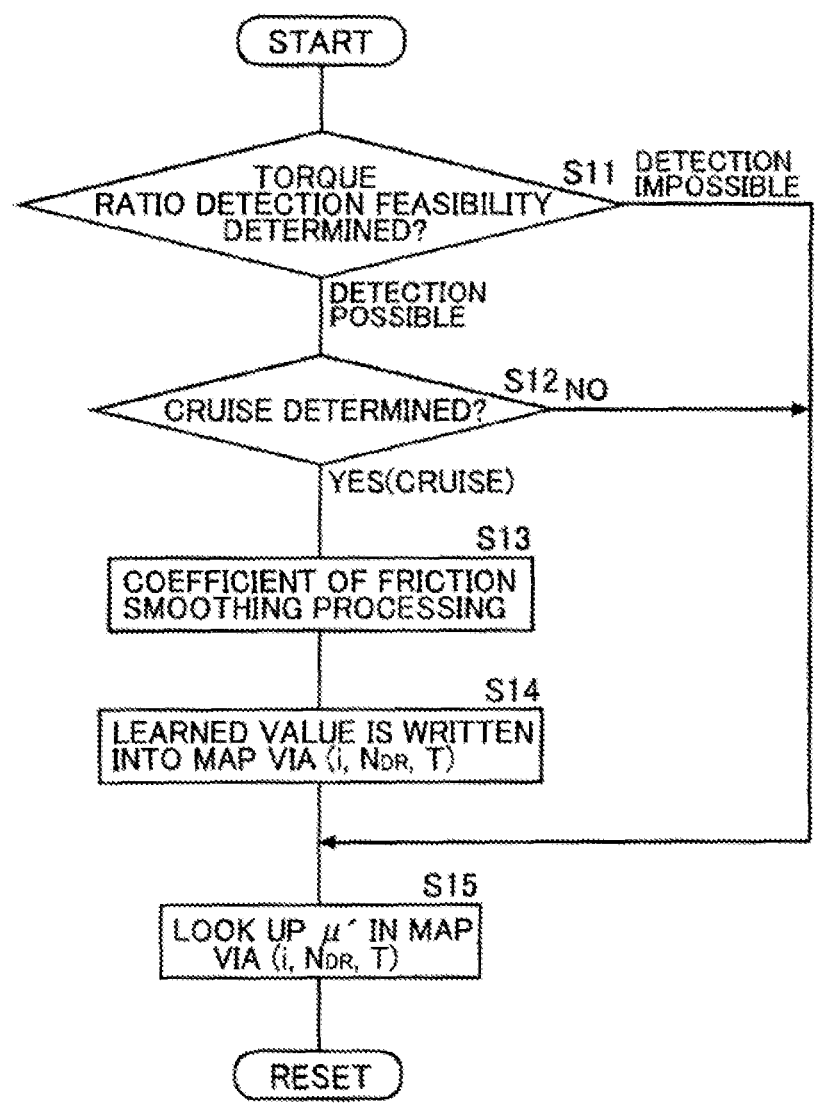
FIG. 11 is a flowchart for learning coefficient of friction. (first embodiment)

That is, if in step S11 of the flowchart of FIG. 11 estimation of the torque ratio Tr by the torque ratio estimation means M1 is possible, then in step S12 the cruise determination means M9 determines whether or not the vehicle is in a cruise state based on the vehicle speed, the accelerator opening degree, the steering angle, etc. If it is found from the determination that the vehicle is in a cruise state, then in step S13 the coefficient of fiction $\mu$ estimated by the coefficient of friction estimation means M3 is smoothed, and in step S14 the coefficient of friction p is stored in a map so as to correspond to running conditions of the belt type continuously variable transmission TM, that is, the gear ratio i, the input shaft rotational speed $N_{DR}$, and the load torque T.

In step S15, a coefficient of friction $\mu'$, which has already been learned, is looked up in the map using as parameters the gear ratio i, the input shaft rotational speed $N_{DR}$, and the load torque T, which represent running conditions at a given time of the belt type continuously variable transmission TM.

Subsequently, the necessary axial thrust calculation means M5 calculates a necessary axial thrust Q of the pulley 13, 14 on the side that is subjected to the lateral pressure control that is necessary for preventing the endless belt 15 from slipping based on the learned coefficient of friction $\mu'$ outputted by the coefficient of friction learning means M4.

The necessary axial thrust Q is different for a case in which the drive pulley 13 is subjected to lateral pressure control and a case in which the driven pulley 14 is subjected to lateral pressure control, and when the drive pulley 13 is subjected to lateral pressure control, that is, when the drive pulley 13 slips, it is calculated using $$Q = T \cos \alpha / 2\mu' R S Tr \quad (14),\text{ and}$$

when the driven pulley 14 is subjected to lateral pressure control, that is, the driven pulley 14 slips, it is calculated using $$Q = T\eta i \cos \alpha / 2\mu' R S Tr \quad (15).$$

Here, $\alpha$ is the angle that is half of the V angle of the pulley 13, 14, $\mu'$ is the learned value for the coefficient of friction between the contacting faces of the endless belt 15 and the pulley 13, 14 on the side that is subjected to lateral pressure control, R is the winding radius of the endless belt 15 around the pulley 13, 14 on the side that is subjected to lateral pressure control, T is the load torque, STr is the target torque ratio, $\eta$ is the power transmission efficiency of the belt type continuously variable transmission TM, and i is the speed ratio.

Figure 12:
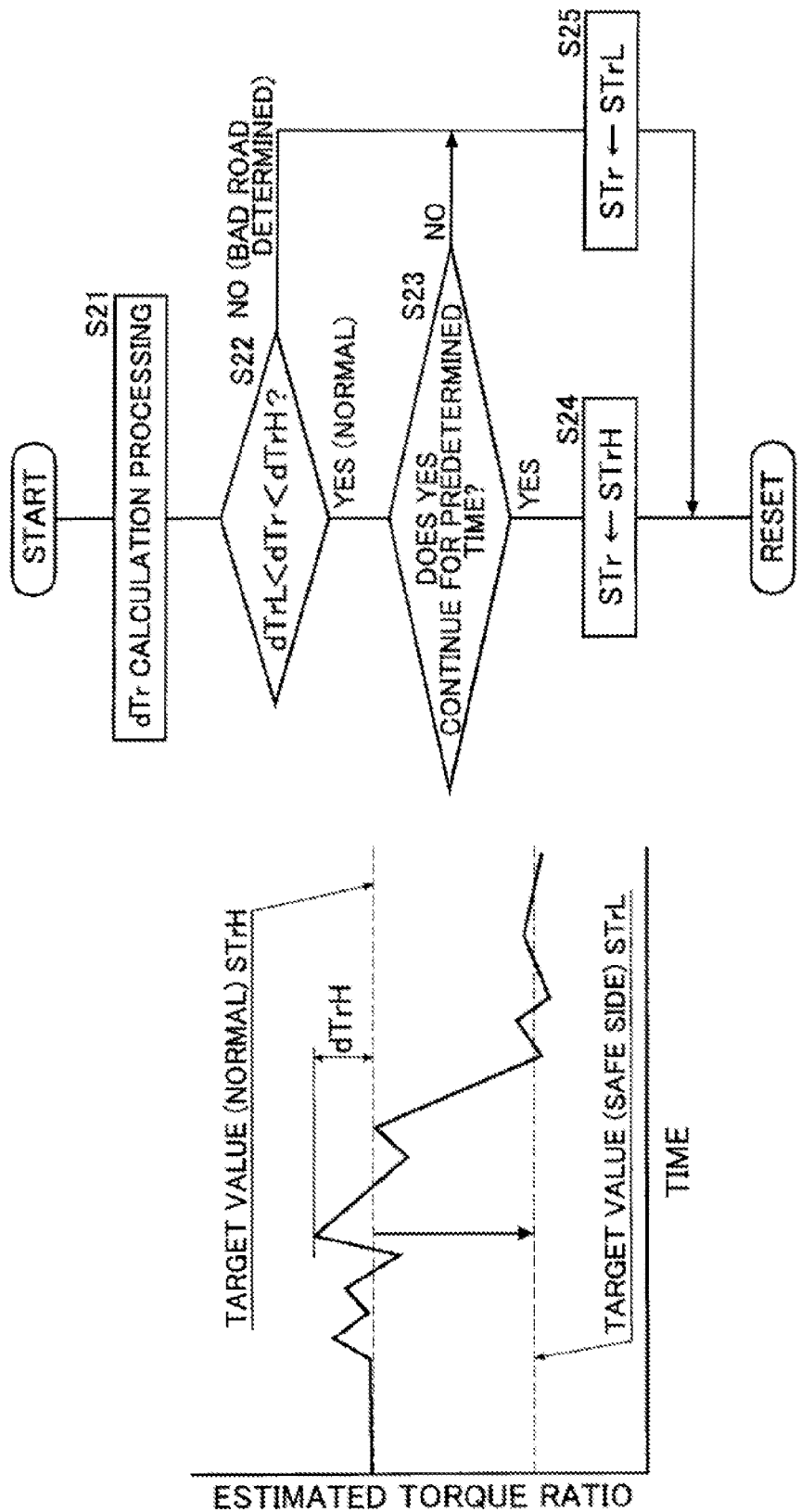
FIG. 12 is a diagram showing one example of setting of a target torque ratio. (first embodiment)

One example of setting of the target torque ratio STr is now explained by reference to FIG. 12.

As was explained for FIG. 5, the power transmission efficiency of the belt type continuously variable transmission TM becomes a maximum when the torque ratio Tr is a value that is no greater than 1.0 and is close to 1.0, and this value is set as a target torque ratio STr.

When the necessary axial thrust calculation means M5 calculates the necessary axial thrust Q, the target torque ratio STr is corrected by the torque ratio variation monitoring means M10 according to a variation in the estimated torque ratio Tr. That is, in step S21 of the flowchart of FIG. 12, a deviation dTr of the torque ratio Tr is calculated by subtracting the previous value from the present value for the torque ratio Tr, and if in step S22 it is determined that, because of the torque ratio deviation dTr deviating from the range dTrL<dTr<dTrH, the vehicle is traveling on a bad road and a load that is transmitted back from the road surface to the belt type continuously variable transmission TM varies greatly, then in step S25 the target torque ratio STr is decreased to the low torque ratio STrL. If in step S22 above the torque ratio deviation dTr returns to the range dTrL<dTr<dTrH and in step S23 that state continues for a predetermined time, then in step S24 the target torque ratio STr is increased to the high torque ratio STrH.

By so doing, when the situation is normal the target torque ratio STr is set high to thus reduce the pulley lateral pressure, thereby improving the power transmission efficiency, and when there is a possibility of slip occurring between the endless belt 15 and the pulleys 13 and 14 of the belt type continuously variable transmission TM due to the load from the road surface when traveling on a bad road, the target torque ratio STr is set low to thus increase the pulley lateral pressure, thereby protecting the belt type continuously variable transmission TM. Furthermore, by imparting hysteresis in step S23 above it is possible to prevent the target torque ratio STr from being frequently switched over.

Figure 13:
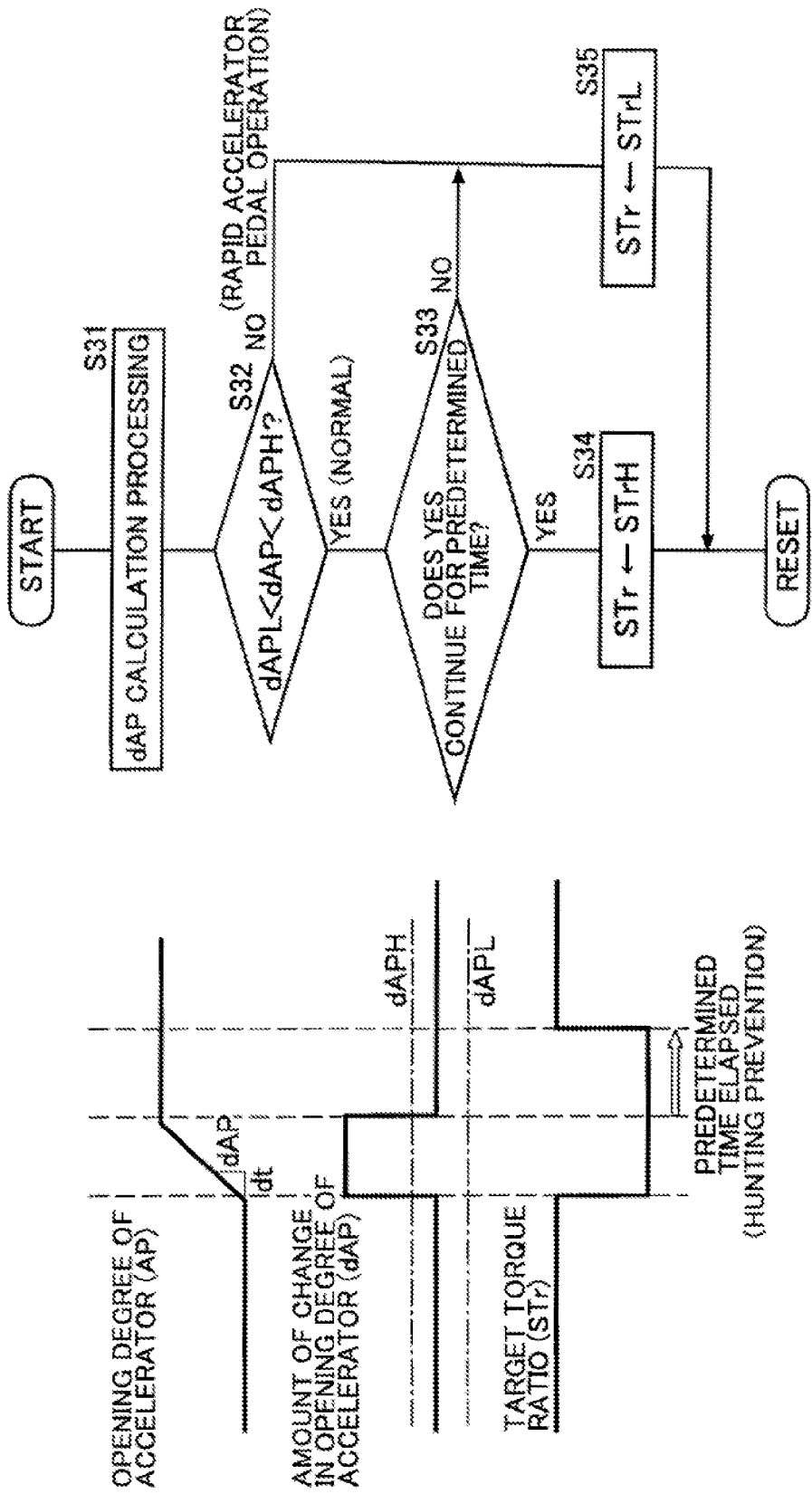
FIG. 13 is a diagram showing another example of setting of a target torque ratio. (first embodiment)

Another example of setting of the target torque ratio STr is now explained by reference to FIG. 13.

When the necessary axial thrust calculation means M5 calculates the necessary axial thrust Q, the torque ratio variation monitoring means M10 corrects the target torque ratio STr according to a variation in the accelerator opening degree AP detected by the accelerator opening degree sensor Se (see FIG. 10). That is, in step S31 of the flowchart of FIG. 13, a percentage change dAP of the accelerator opening degree AP is calculated by subtracting the previous value from the present value for the accelerator opening degree AP, and if in step S32 it is determined that, because of the percentage change dAP of the accelerator opening degree deviating from dAPL<dAP<dAPH, an accelerator pedal is rapidly depressed or the accelerator pedal is rapidly returned, then in step S35 the target torque ratio STr is decreased to a low torque ratio STrL. If in step S32 above the percentage change dAP of the accelerator opening degree returns into the range dAPL<dAP<dAPH and in step S33 that state continues for a predetermined time, then in step S34 the target torque ratio STr is increased to a high torque ratio STrH.

By so doing, when the situation is normal the target torque ratio STr is set high to thus reduce the pulley lateral pressure, thereby improving the power transmission efficiency, and when there is a possibility of slip occurring between the endless belt 15 and the pulleys 13 and 14 of the belt type continuously variable transmission TM due to the accelerator pedal being operated rapidly, the target torque ratio STr is set low to thus increase the pulley lateral pressure, thereby protecting the belt type continuously variable transmission TM. Furthermore, by imparting hysteresis in step S33 above it is possible to prevent the target torque ratio STr from being frequently switched over.

In this way, when the necessary axial thrust calculation means M5 calculates the necessary axial thrust Q of the pulley 13, 14 on the side that is subjected to lateral pressure control, the current value conversion means M6 converts the necessary axial thrust Q to a value for the current of a linear solenoid of an oil pressure circuit, and operating the linear solenoid at this value for the current enables the necessary axial thrust Q to be generated in the pulley 13, 14 on the side that is subjected to lateral pressure control, thereby carrying out lateral pressure control.

As described above, in accordance with the present embodiment, when estimating the torque ratio Tr of the belt type continuously variable transmission TM based on the transmission characteristics involved in transmitting a variable component of the input shaft 11 to the output shaft 12 via the endless belt 15, since at least one of the slip identifier IDslip, which is an indicator for the ratio of the amplitude of the variable component between the input shaft 11 and the output shaft 12, and the phase lag Δϕ, which is an indicator for difference in phase of the variable component between the input shaft 11 and the output shaft 12, is used, it is possible to estimate the torque ratio Tr, which is very closely related to the power transmission efficiency of the belt type continuously variable transmission TM, with good precision, thus improving the power transmission efficiency. Moreover, since the torque ratio Tr is estimated from the slip identifier IDslip or the phase lag Δϕ, it is possible to minimize the number of sensors necessary for the estimation, thus reducing the cost.

Furthermore, since the coefficient of friction p between the endless belt 15 and the pulley 13, 14 on the side that is subjected to lateral pressure control is estimated without being accompanied by the occurrence of macro slip, the necessary axial thrust Q of the pulley 13, 14 is determined based on the coefficient of friction p, and the lateral pressure of the pulley 13, 14 is controlled based on the necessary axial thrust Q, that is, since the lateral pressure is feedforward controlled using the coefficient of friction p, which is a parameter directly ruling the lateral pressure, compared with indirect control where the slip identifier IDslip or the phase lag Δϕ itself is fed back, it is possible to improve the control responsiveness and reduce the computation load of the control device.

Moreover, since the cruise determination means M9 determines whether or not the vehicle is cruising, and the coefficient of friction learning means M4 learns the coefficient of friction it when the vehicle is in the cruise state, it is possible to continue lateral pressure control with good precision even in the case in which it has become impossible to calculate a temporarily coefficient of friction it for some reason as long as the time is short enough that a change over time does not occur.

Figure 14:
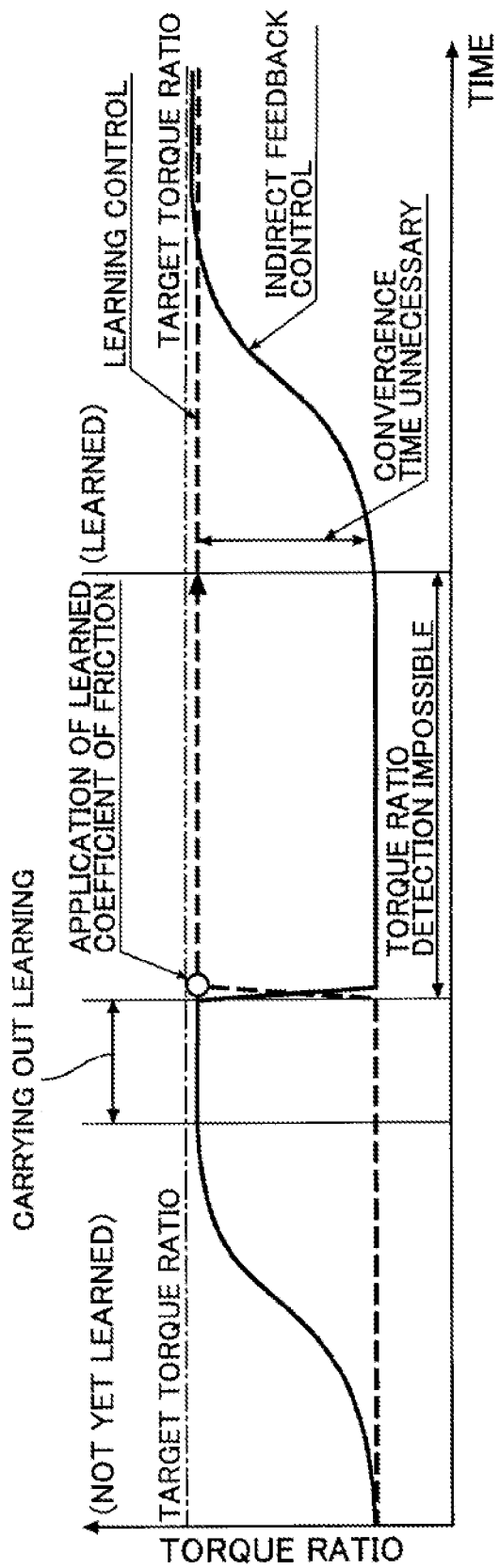
FIG. 14 is a diagram for explaining the effect of learning. (first embodiment)

FIG. 14 explains the effect of learning of the coefficient of friction μ, the solid line corresponding to a case in which learning is not carried out, and the broken line corresponding to a case in which learning is carried out. In the case in which learning is not carried out, when it becomes impossible to estimate the torque ratio Tr the actual torque ratio Tr deviates greatly from the target torque ratio STr, and even if it becomes possible to estimate the torque ratio Tr it takes time for the actual torque ratio Tr to converge to the target torque ratio STr; when learning is carried out, even if it becomes impossible to estimate the torque ratio Tr the actual torque ratio Tr does not deviate greatly from the target torque ratio STr, and control of the pulley lateral pressure can be continued with good precision.

Figure 15:
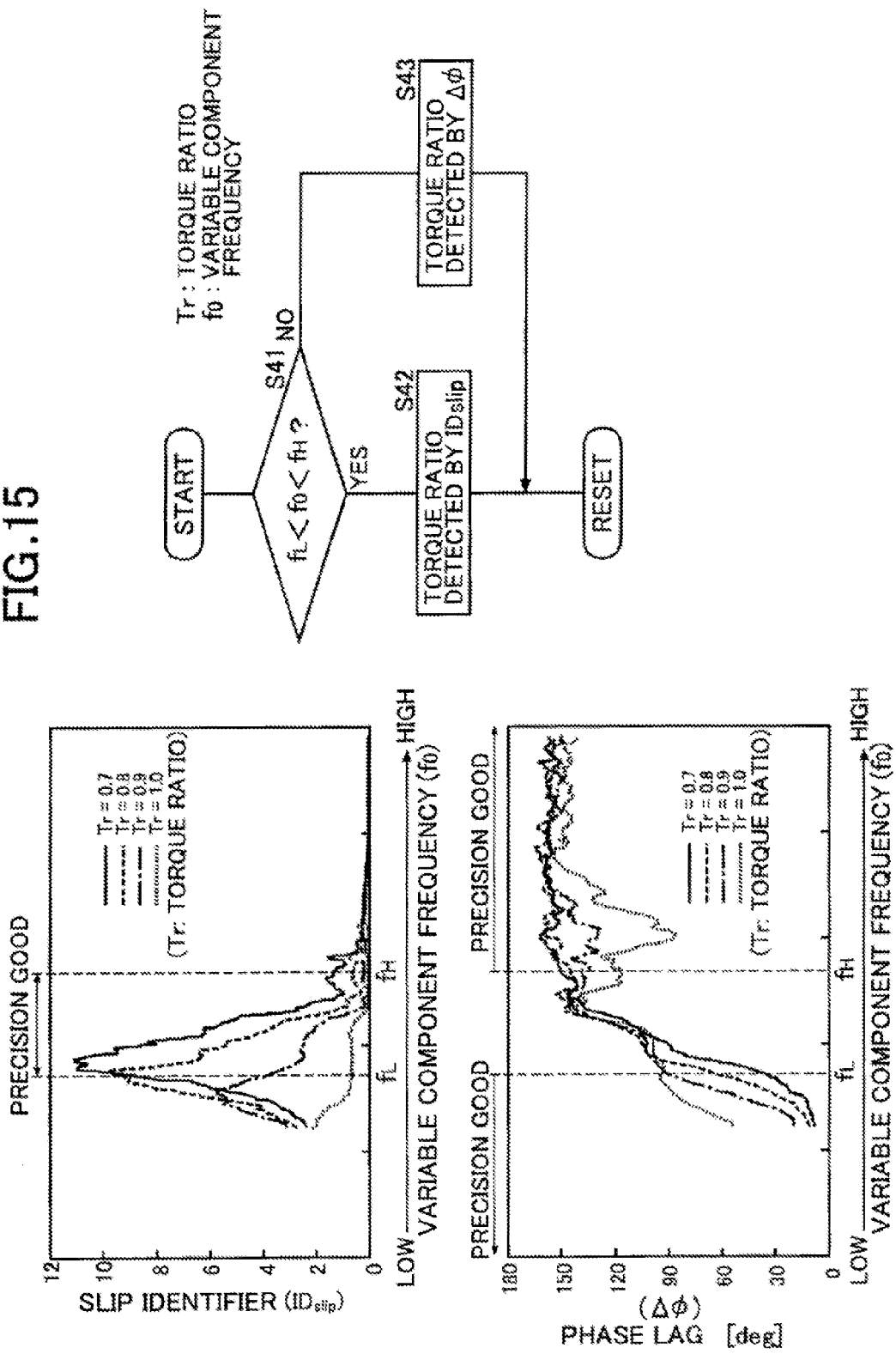
FIG. 15 is a diagram for explaining a method for estimating torque ratio. (second embodiment)

A second embodiment of the present invention is now explained by reference to FIG. 15.

Second Embodiment

As is clear from a map via which a torque ratio Tr is looked up based on a frequency $f_0$ of a variable component and a slip identifier IDslip, in an intermediate region ($f_L < f_0 < f_H$) of the frequency $f_0$ of the variable component, the vertical gap between characteristic lines of torque ratios Tr is large, but in other regions the gap is small, and the precision for estimating the torque ratio Tr therefore improves in the region where $f_L < f_0 < f_H$. Furthermore, as is clear from a map via which a torque ratio Tr is looked up based on the frequency $f_0$ of the variable component and a phase lag Δϕ, the vertical gap between characteristic lines of torque ratios Tr is large in a region ($f_0 \leq f_L$) in which the frequency $f_0$ of the variable component is low and in a region ($f_0 \geq f_H$) in which it is high, and the gap is small in the other region, the precision for estimating the torque ratio Tr therefore improving in the region $f_0 \leq f_L$ and the region $f_0 \geq f_H$.

From the above, if in step S41 $f_L < f_0 < f_H$ is satisfied, then in step S42 the torque ratio Tr is looked up in the map having the frequency $f_0$ of the variable component and the slip identifier IDslip as parameters, and if in step S41 above $f_0 \leq f_L$ or $f_0 \geq f_H$ is satisfied, then in step S43 the torque ratio Tr is looked up in the map having the frequency $f_0$ of the variable component and the phase lag $\Delta\phi$ as parameters. This enables the precision with which the torque ratio Tr is estimated to be further enhanced.

A third embodiment of the present invention is now explained by reference to FIG. 16 and FIG. 17.

Third Embodiment

Figure 16:
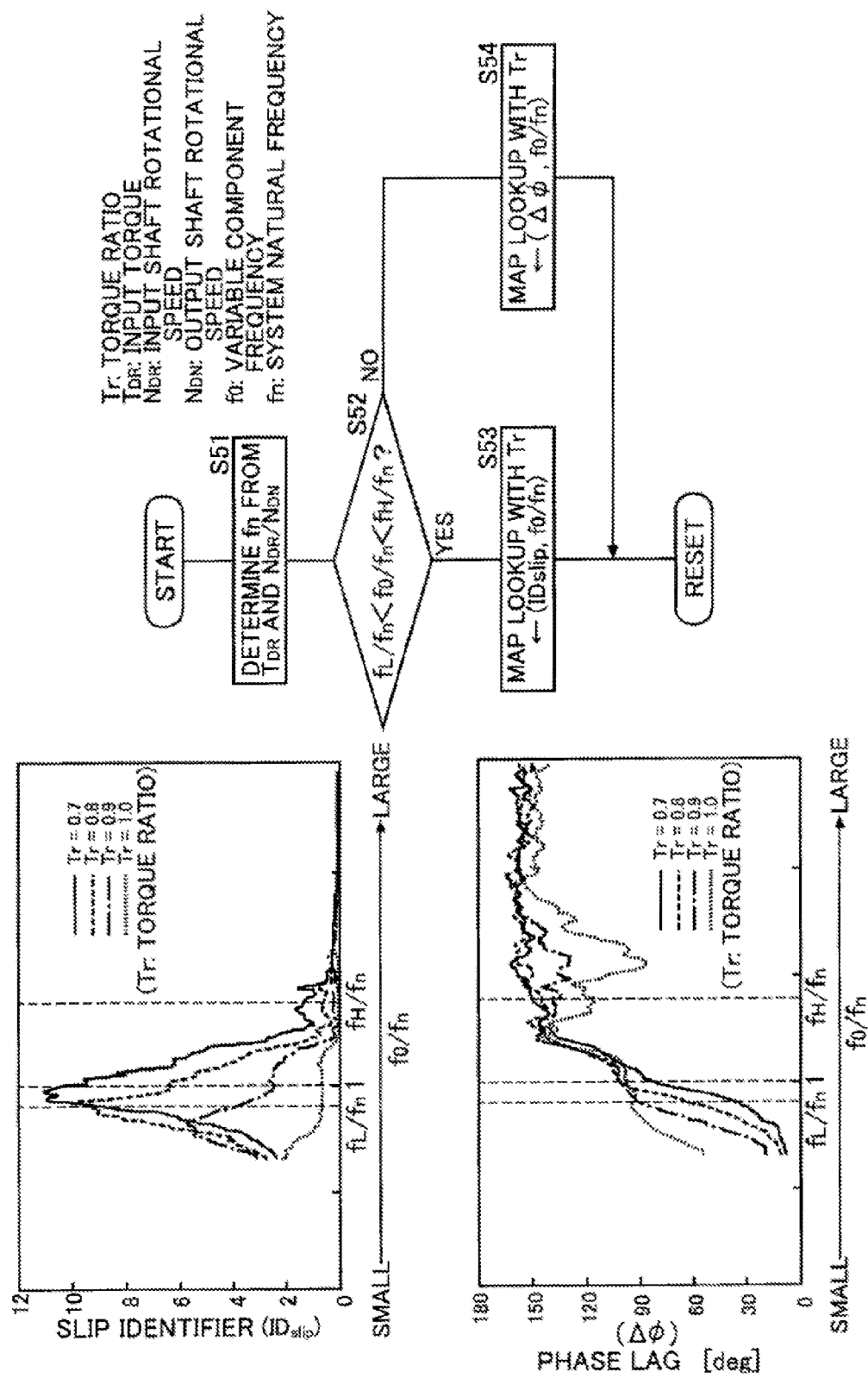
FIG. 16 is a diagram for explaining a method for estimating torque ratio. (third embodiment)

In FIG. 16, characteristic lines of a map via which a torque ratio Tr is looked up based on a frequency $f_0$ of a variable component and a slip identifier IDslip move in parallel to the direction of the abscissa when a system natural frequency $f_n$ changes. Since the natural frequency $f_n$ changes in response to the input torque and the gear ratio of a belt type continuously variable transmission TM, it is necessary to prepare a plurality of maps for estimating the torque ratio Tr according to each natural frequency $f_n$, and there is the problem that this causes an increase in memory storage capacity or an increase in cost. The reason why the natural frequency $f_n$ of the system changes is shown in FIG. 17.

FIG. 17 (A) is a model of the belt type continuously variable transmission TM as an oscillatory system; masses m1 and m2 are in contact with a drive pulley 13 and a driven pulley 14, and the masses m1 and m2 are connected by an endless belt 15, which is formed from a spring and a dashpot. The endless belt 15 of the belt type continuously variable transmission TM is formed by supporting a large number of metal elements on a metal ring assembly formed by layering a plurality of metal rings, and transmits a driving force by pressing the metal elements against each other. Due to the contact surfaces between the metal elements deforming by compression to increase the contact area in response to increase in the input torque (corresponding to a torque that is currently being transmitted by the belt type continuously variable transmission TM), it gradually becomes difficult to deform the metal elements by compression, the spring rigidity of the spring of the model increases (see FIG. 17 (B)), and as a result the natural frequency $f_n$ of the system increases in response to an increase in the input torque (see FIG. 17 (C)).

Furthermore, when the gear ratio of the belt type continuously variable transmission TM changes toward LOW, since the rotational speed of an output shaft 12 decreases relative to the rotational speed of an input shaft 11, the same effect as that of a moment of inertia J2 of the output shaft 12 itself decreasing is obtained, whereas when the gear ratio of the belt type continuously variable transmission TM changes to OD, since the rotational speed of the output shaft 12 increases relative to the rotational speed of the input shaft 11, the same effect as that of the moment of inertia J2 of the output shaft 12 itself increasing is obtained, and the natural frequency $f_n$ of the system thereby increases when the gear ratio changes toward LOW (see FIG. 17 (D)).

In step S51 of the flowchart of FIG. 16, the natural frequency $f_n$ is calculated from an input torque $T_{DR}$ and a gear ratio. Since the input torque $T_{DR}$ coincides with the load torque of an engine E, a value obtained by calculation in an ECU of the engine E may be used, and the gear ratio can be calculated in an electronic control unit U as $N_{DR}/N_{DN}$, which is the ratio of an input shaft rotational speed $N_{DR}$ detected by an input shaft rotational speed sensor Sa and an output shaft rotational speed $N_{DN}$ detected by an output shaft rotational speed sensor Sb.

Subsequently in step S52 the frequency $f_0$ and upper and lower threshold values $f_L$ and $f_H$ of the variable component are normalized by dividing by the natural frequency $f_n$. This enables a common map using normalized frequency as a parameter to be used without preparing maps used when looking up the torque ratio Tr for each frequency region, and it is possible to reduce the memory storage capacity and reduce the cost. In the same manner as for the second embodiment, if $f_L/f_n < f_0/f_n < f_H/f_n$, then in step S53 the torque ratio Tr is looked up in a map employing the normalized frequency $f_0/f_n$ of the variable component and the slip identifier IDslip as parameters, and if step S52 above $f_0/f_n \leq f_L/f_n$ or $f_0/f_n \geq f_H/f_n$, then in step S54 the torque ratio Tr is looked up in a map employing the normalized frequency $f_0/f_n$ of the variable component and a phase lag $\Delta\phi$ as parameters. This enables the precision with which the torque ratio Tr is estimated to be further enhanced.

A fourth embodiment of the present invention is now explained by reference to FIG. 18.

Fourth Embodiment

In each of the above embodiments, either one of the two parameters, that is, the slip identifier IDslip and the phase lag $\Delta\phi$, is used to estimate the torque ratio Tr, but in a fourth embodiment a torque ratio Tr is estimated using both parameters, that is, a slip identifier IDslip and a phase lag $\Delta\phi$.

FIG. 18 is a map in which characteristics of the slip identifier IDslip and the phase lag $\Delta\phi$ of each torque ratio Tr are expressed as polar coordinates with the square root of the slip identifier IDslip as a radius and the phase lag $\Delta\phi$ as a polar angle. For example, when the value for the slip identifier IDslip is $r_2$ and the value for the phase lag $\Delta\phi$ is $\theta$, the torque ratio Tr at that time can be estimated as 0.7. In accordance with this embodiment, since the torque ratio Tr is estimated using both the slip identifier IDslip and the phase lag $\Delta\phi$, it is possible to enhance the precision of estimation.

Modes for carrying out the present invention are explained above, but the present invention may be modified in a variety of ways as long as the modifications do not depart from the spirit and scope thereof.

For example, the variable component of the input shaft 11 and the output shaft 12 of the present invention is not limited to rotational speed, and may be torque.

Furthermore, the input shaft 11 may be a crankshaft of the engine E connected thereto.

Moreover, in the embodiments the frequency $f_0$ of the variable component is calculated from the engine rotational speed detected by the engine rotational speed sensor Sc, but the frequency $f_0$ of the variable component may be calculated from the input shaft rotational speed detected by the input shaft rotational speed sensor Sa or an ignition timing signal of the engine E.

Furthermore, in the embodiment the oil pressure of the pulley 13, 14 is detected by the oil pressure sensor Sd, but it may be converted from a value of the current of the linear solenoid.

Moreover, in the embodiment the belt type continuously variable transmission TM having the endless belt 15 is explained, but the continuously variable transmission of the present invention may be a chain belt type continuously variable transmission or a toroidal continuously variable transmission. In the case of a toroidal continuously variable transmission, an input disk provided on an input shaft corresponds to the input shaft element of the present invention, an output disk provided on an output shaft corresponds to the output shaft element of the present invention, a power roller that is held between the input disk and the output disk and transmits a driving force corresponds to the power transmission element of the present invention, and a pressure that holds the power roller between the input disk and the output disk corresponds to the compression of the present invention.

The invention claimed is:
1. A compression control device for a continuously variable transmission, comprising:
an input shaft to which a driving force of a drive source is inputted;
an input shaft element that is provided on the input shaft;
an output shaft via which the driving force of the drive source is changed in speed and outputted;
an output shaft element that is provided on the output shaft;
a power transmission element that is in contact with each of the input and output shaft elements and transmits the driving force from the input shaft to the output shaft by friction in contacting portions;
torque ratio estimation means that estimates a torque ratio, which is the ratio of an actually transmitted torque relative to a maximum transmittable torque, based on characteristics of transmission of a given variable component of the input shaft to the output shaft;
compression control means that controls compression of either one shaft element of the input and output shaft elements; and
coefficient of friction estimation means that estimates a coefficient of friction between said either one shaft element and the power transmission element,
wherein the torque ratio estimation means estimates the torque ratio from at least one of a slip identifier, which is an indicator for the ratio of an amplitude of the variable component between the input shaft and the output shaft, and a phase lag, which is an indicator for difference in phase of the variable component between the input shaft and the output shaft,
the coefficient of friction estimation means estimates the coefficient of friction based on the torque ratio,
the compression control means determines a necessary axial thrust of said either one shaft element based on the coefficient of friction and controls the compression of said either one shaft element based on the necessary axial thrust, and
wherein the device comprises load torque estimation means that estimates a load torque of the drive source, and the coefficient of friction estimation means estimates the coefficient of friction based on the load torque and the axial thrust of said either one shaft element.

2. A compression control device for a continuously variable transmission, comprising:
an input shaft to which a driving force of a drive source is inputted;
an input shaft element that is provided on the input shaft;
an output shaft via which the driving force of the drive source is changed in speed and outputted;
an output shaft element that is provided on the output shaft;
a power transmission element that is in contact with each of the input and output shaft elements and transmits the driving force from the input shaft to the output shaft by friction in contacting portions;
torque ratio estimation means that estimates a torque ratio, which is the ratio of an actually transmitted torque relative to a maximum transmittable torque, based on characteristics of transmission of a given variable component of the input shaft to the output shaft;
compression control means that controls compression of either one shaft element of the input and output shaft elements;
coefficient of friction estimation means that estimates a coefficient of friction between said either one shaft element and the power transmission element; and
cruise determination means that determines whether or not a moving object equipped with the drive source and the continuously variable transmission is cruising and coefficient of friction learning means that learns the coefficient of friction for each of travel conditions of the moving object when the moving object is in a cruise state,
wherein the torque ratio estimation means estimates the torque ratio from at least one of a slip identifier, which is an indicator for the ratio of an amplitude of the variable component between the input shaft and the output shaft, and a phase lag, which is an indicator for difference in phase of the variable component between the input shaft and the output shaft,
the coefficient of friction estimation means estimates the coefficient of friction based on the torque ratio, and
the compression control means determines a necessary axial thrust of said either one shaft element based on the coefficient of friction and controls the compression of said either one shaft element based on the necessary axial thrust.

3. A compression control device for a continuously variable transmission, comprising:
an input shaft to which a driving force of a drive source is inputted;
an input shaft element that is provided on the input shaft;
an output shaft via which the driving force of the drive source is changed in speed and outputted;
an output shaft element that is provided on the output shaft;
a power transmission element that is in contact with each of the input and output shaft elements and transmits the driving force from the input shaft to the output shaft by friction in contacting portions;
torque ratio estimation means that estimates a torque ratio, which is the ratio of an actually transmitted torque relative to a maximum transmittable torque, based on characteristics of transmission of a given variable component of the input shaft to the output shaft;
compression control means that controls compression of either one shaft element of the input and output shaft elements; and
coefficient of friction estimation means that estimates a coefficient of friction between said either one shaft element and the power transmission element,
wherein the torque ratio estimation means estimates the torque ratio from at least one of a slip identifier, which is an indicator for the ratio of an amplitude of the variable component between the input shaft and the output shaft, and a phase lag, which is an indicator for difference in phase of the variable component between the input shaft and the output shaft,
the coefficient of friction estimation means estimates the coefficient of friction based on the torque ratio,
the compression control means determines a necessary axial thrust of said either one shaft element based on the coefficient of friction and controls the compression of said either one shaft element based on the necessary axial thrust, and
wherein the compression control means determines the necessary axial thrust for said either one shaft element based on a target torque ratio and sets the target torque ratio at a low level when an amount of change of the torque ratio determined by the torque ratio estimation means goes outside a predetermined range.

4. A compression control device for a continuously variable transmission, comprising:
- an input shaft to which a driving force of a drive source is inputted;
- an input shaft element that is provided on the input shaft;
- an output shaft via which the driving force of the drive source is changed in speed and outputted;
- an output shaft element that is provided on the output shaft;
- a power transmission element that is in contact with each of the input and output shaft elements and transmits the driving force from the input shaft to the output shaft by friction in contacting portions;
- torque ratio estimation means that estimates a torque ratio, which is the ratio of an actually transmitted torque relative to a maximum transmittable torque, based on characteristics of transmission of a given variable component of the input shaft to the output shaft;
- compression control means that controls compression of either one shaft element of the input and output shaft elements; and
- coefficient of friction estimation means that estimates a coefficient of friction between said either one shaft element and the power transmission element,
- wherein the torque ratio estimation means estimates the torque ratio from at least one of a slip identifier, which is an indicator for the ratio of an amplitude of the variable component between the input shaft and the output shaft, and a phase lag, which is an indicator for difference in phase of the variable component between the input shaft and the output shaft,
- the coefficient of friction estimation means estimates the coefficient of friction based on the torque ratio,
- the compression control means determines a necessary axial thrust of said either one shaft element based on the coefficient of friction and controls the compression of said either one shaft element based on the necessary axial thrust, and
- wherein the device comprises an accelerator opening degree sensor that detects an accelerator opening degree, and
- the compression control means determines the necessary axial thrust for said either one shaft element based on a target torque ratio and sets the target torque ratio at a low level when an amount of change of the accelerator opening degree determined by the accelerator opening degree sensor goes outside a predetermined range.

* * * * *